United States Patent [19]

Aubry et al.

[11] Patent Number: 5,004,215
[45] Date of Patent: Apr. 2, 1991

[54] RESILIENT RETURN STRUT OF THE ELASTIC-HYDRAULIC TYPE WITH INCORPORATED LINEAR DAMPING BY THROTTLING A HIGH-VISCOSITY FLUID

[75] Inventors: Jacques A. Aubry, Cabries; Jean J. Mondet, Vitrolles, both of France

[73] Assignee: Aerospatiale Societe Nationale Industrielle, Paris, France

[21] Appl. No.: 525,301

[22] Filed: May 17, 1990

Related U.S. Application Data

[62] Division of Ser. No. 328,371, Mar. 24, 1989, abandoned.

[30] Foreign Application Priority Data

Mar. 24, 1988 [FR] France ................... 88 03880

[51] Int. Cl.⁵ ............................................. F16F 5/00
[52] U.S. Cl. ............................... 267/140.1; 180/312;
  248/562; 416/134 A; 416/500
[58] Field of Search .............. 267/140.1 R, 140.1 C,
  267/140.1 A, 141.2, 219, 220; 180/300, 312,
  902; 416/134 A, 500, 106, 107; 248/562, 631

[56] References Cited

U.S. PATENT DOCUMENTS

| 2,919,883 | 1/1960 | Murphy | 267/140.1 R |
|---|---|---|---|
| 3,314,600 | 4/1967 | Hadley | 137/855 X |
| 3,361,216 | 1/1968 | Walker | 416/500 X |
| 3,595,349 | 2/1971 | Ortheil | 188/289 |
| 3,698,284 | 10/1972 | Toering et al. | 188/289 X |
| 4,401,298 | 8/1983 | Eaton et al. | 267/219 X |
| 4,566,677 | 1/1986 | Pierres | 416/134 A X |
| 4,643,139 | 2/1987 | Hargreaves | 137/855 X |
| 4,733,854 | 3/1988 | Miyamoto | 267/140.1 A |
| 4,741,521 | 5/1988 | Schiffner et al. | 267/140.1 C |

FOREIGN PATENT DOCUMENTS

| 0097091 | 12/1983 | European Pat. Off. | |
| 2592696 | 7/1987 | France. | |
| 76372 | 5/1982 | Japan | 137/855 |

*Primary Examiner*—George E. A. Halvosa
*Attorney, Agent, or Firm*—Pollock, Vande Sande & Priddy

[57] ABSTRACT

The resilient return strut is of the elastic-hydraulic type with incorporated linear damping by throttling a high-viscosity fluid, and comprises a damper (1) mounted between two return springs (2, 3) in elastomer-based sleeves (17, 18), undergoing a shearing action and sealing the chambers (34, 35) set off within the body of the damper (12) by a transverse wall (10) which marks off a permanent throttling passage around a central brace (23). Limiting valves equipped with spring-leaves (45) sealing the holes (40) bored in the wall (10) increase the throttling section. A compressed-air system (52), mounted in a spring (2), compensates for thermal expansion of the fluid. The device is used with helicopter rotors.

52 Claims, 7 Drawing Sheets

RESILIENT RETURN STRUT OF THE ELASTIC-HYDRAULIC TYPE WITH INCORPORATED LINEAR DAMPING BY THROTTLING A HIGH-VISCOSITY FLUID

This application is a division, of application Ser. No. 07/328,371, filed Mar. 24, 1989.

FIELD OF THE INVENTION

The object of the present invention is a resilient return strut of the elastic hydraulic type with incorporated linear damping, by throttling a high-viscosity fluid, such as, in particular, a silicone-based fluid.

A strut of this type is designed more specifically, but not solely, for equipping aerodyne rotors of rotary-wing aircraft, and, in particular, helicopter rotors.

BACKGROUND OF THE INVENTION

On helicopter-supporting rotors, whose hinged-type hubs comprise, in particular, for each blade what is termed a drag hinge articulated around an axis perpendicular to the plane of the blade, thereby allowing this blade to freely oscillate within the rotational plane of the rotor, it is well understood that advantage is gained by providing for, around this hinge, the vigorous elastic return of each blade toward its median angular position, in such a way as to be able to adjust the natural vibrating frequency of the blade assembly on which drag is exerted, and it is also well understood that it is imperative to dampen these angular drag oscillations of the blade in order to minimize the transmission of dynamic drag stresses traveling from the blade toward the helicopter frame, while avoiding any instability which may arise from connections between oscillations resulting from aerodynamic stresses and the mechanical reactions of rotor and fuselage elements, both during the operational raising and lowering of the rotor speed during take-off and landing, and in flight when the rotor turns with its substantially stabilized operational rotation speed.

It is known that the dynamic drag characteristics of a blade of a helicopter-supporting rotor are a function of the value of its initial natural mode of vibration under the force of drag, which is in turn a function, first, of the centrifugal return of the blade on which drag occurs, caused by the centrifugal force which is exerted radially to the center of gravity of the blade, and of a possible additional elastic drag-induced return brought about by any device exerting elastic resistance to the angular displacements of the blade around its median position under the force of drag, and, second, of damping induced in the alternating angular movements of the blade around its drag hinge.

To obtain the correct operation of the rotor in the face of these dynamic phenomena, the two parameters, i.e., the position of the initial drag mode and damping, must be mutually adjusted.

To meet this requirement, it has recently been proposed that resilient return struts of the hydraulic-elastic type having incorporated damping be used, each of which is a piece of equipment providing simultaneously for the elastic return of a blade subjected to drag by means of the deformation of a mass of flexible material, and damping by means of a hydraulic device.

Struts of this type, examples of which are described in French Patents Nos. 2 528 382 and 2 592 696, have been developed based on rotating dampers operating by throttling and using high-viscosity fluids, such as those described in French Patents Nos. 2 256 347 and 2 592 449, as well as tubular fluid dampers such as those described in French Patent No. 2 573 829, whose principles of operation have been proposed as models for the construction of resilient return struts having incorporated linear damping.

The rotational damper operating by throttling a high-viscosity fluid, as described in French Patent 2 256 347, is composed of the coaxial arrangement of a rotor and a stator fitted with radial blades which are made unitary alternately with the rotor and the stator in a circumferential direction, and demarcating within the damper, which is closed off transversely from the axis of the rotor and the stator by at least one cover, a main inner chamber filled with a viscous fluid.

The blades are connected to means for the throttling of the fluid which flows from one to the other of different capacities set off by the blades within the main inner chamber when the damper rotor and stator are induced in relative rotation around their common axis. Damping is thus produced by the transfer of the viscous fluid through the throttling means produced by the action of the rotation of the blades connected to the rotor, in relation to the blades connected to the stator. Compensation for thermal expansion of the viscous fluid is provided for by the existence of an auxiliary chamber filled with a volume of this viscous fluid and permanently feeding into the main inner chamber by at least one small-diameter hole opened in a bottom of the damper separating the main and auxiliary chambers. The viscous fluid contained in the auxiliary chamber is pressurized by a piston activated by spring washers, in order to ensure the constant feeding of the main chamber under static pressure. Furthermore, the auxiliary chamber is connected to the main chamber by at least one hole having a larger diameter which cooperates with a supercharging valve equipped with a spring-leaf attached to the bottom surface through which the large-diameter hole is drilled on the side facing the inner chamber, in such a way as to act as a reverse-lock valve which inhibits the flow of the viscous fluid from the main chamber toward the auxiliary chamber, but which permits a flow in the opposite direction when the part of the main chamber in which this large-diameter hole opens out is depressed.

A rotational damper of this kind is made to be particularly economical because of the use of a high-viscosity fluid, which makes it possible to attribute high values to the operational play among the functioning parts of the damper, and simultaneously to use simplified throttle means to create the damping forces, as well as valves having an equally simple structure for related functions, such as compensation for thermal expansion of the viscous fluid and the supercharging of the main chamber of the damper.

A rotating damper of this kind was perfected in French Patent No. 2 592 449, according to which the auxiliary chamber is formed at least partially by a diaphragm which is elastically deformable, thus making it possible to compensate for variations in the volume of the fluid as a function of its temperature. An elastically-deformable diaphragm is, advantageously, fitted on each end, and substantially transverse, surface of the damper, in such a way that two auxiliary chambers are thus demarcated on each side of the stator and rotor, respectively, and, more precisely, formed between one end surface of the damper and the corresponding diaphragm, and at least one feeding passage between each auxiliary chamber and the main chamber is fitted in the corresponding end surface, this feeding passage being small enough to act as a dynamic filter for the frequencies of use of the damper. This arrangement makes it possible to limit the return stress of the elastically-deformable diaphragms, and, because of this circumstance, this return stress may be less than the stress corresponding to the operating pressure of the damper. Furthermore, each end surface is preferably composed of a first ring, linked to the stator, and a second ring, linked to the rotor, and the diaphragm, which is ring-shaped, has inner and outer peripheral edges which are encircled by an inner and outer collar, respectively, to which the diaphragm is made unitary by vulcanization. The inner and outer collars are housed in an annular groove created by the two rings on the corresponding end surface; the water-tightness of the corresponding auxiliary chamber is obtained by means of the adhesion of the inner and outer collars to the walls of the groove, and the feeding passage between the principal chamber and the corresponding auxiliary chamber is formed by a gap created between the two rings of the end surface under consideration. The throttling of the high-viscosity fluid, for example a silicone-based fluid, is two-directional, and takes place between the end of each stator blade and the inner cylindrical, circular wall of the rotor, and means ensuring the unidirectional transfer of the fluid are, furthermore, fitted on each stator blade and are composed of an elastic plate attached by a screw on each blade which seals off an orifice drilled straight through the blade. The auxiliary chambers thus make it possible to compensate for variations in the volume of the viscous fluid filling the main chamber caused by changes in its operating temperature, because of the elastically-deformable diaphragms. These diaphragms, which are made unitary with the stator and rotor, respectively, by means of the inner and outer collars, operate under the action of torsion when motion of the rotor in relation to the stator takes place, in such a manner that they exert some degree of elastic return under the force of torsion, which tends to bring the stator and rotor back into an initial relative position. Furthermore, since the viscous fluid is introduced into the damper under pressure sufficient to produce an elastic deformation of the diaphragms which covers the fluid-volume retraction during low-temperature use, the diaphragms produce the pressurization of the volumes of viscous fluid contained in the auxiliary chambers, thereby ensuring that the main chamber of the damper will be filled under static pressure.

French Patent No. 2 573 829 describes a tubular, fluid-operated damper which produces linear, rotational damping between a tube and an axis central to the tube by means of fluid shearing between two sets of concentric, alternately telescoping tubes in a shearing chamber between the tube and the central axis. Axial water-tightness is achieved by means of two elastic connecting collars between the tube and the central axis, an arrangement such that these elastic collars also produce a rotational, linear elastic return. Furthermore, an expansion chamber, which is coaxial to the shearing chamber, is marked off between the central axis and the outer tube by an annular, expansion diaphragm which separates the expansion chamber from the shearing chamber. This expansion chamber provides for the compensation of heat-induced variation in the volume of the fluid, which is sheared in the damper. A device of this kind may be used as a resilient return strut of the hydraulic-elastic type having linear and rotational damping incorporated by shearing of fluid between two sets of concentric, alternately telescoping tubes. Furthermore, this strut is equipped with a device which compensates for thermally-produced expansion of the sheared fluid, and the elastic plugs which produce the elastic return of the central axis and the outer tube toward the original relative position, also bring about the water-tight sealing of the damper chamber. As regards their use on helicopter rotors, tubular, fluid-operated dampers of this kind do not possess sufficient rigidity, and have a complex structure which is of delicate construction, in particular because the dampers have two coaxial and alternately-telescoping sets of shearing tubes.

For these reasons, French Patents Nos. 2.528.382 and 2.592.696 propose resilient return struts of the hydraulic-elastic type having incorporated damping, which contain:

two rigid devices, each of which is equipped with hinging means designed to connect one of the rigid devices to a first part, such as a blade or a device connecting said blade to a rotor hub, and the other rigid device to a second component, such as said rotor hub,;

at least one resilient return device comprising a mass of a deformable material, which is unitary with the two rigid devices and designed to become deformed when said rigid devices are displaced one in relation to the other, and to produce on said rigid devices a resilient return action tending to bring them back to the initial relative position;

at least one hydraulic damper comprising two working chambers of volume varying in opposition, which contain a relatively viscous hydraulic fluid designed to circulate from one to the other of the chambers through at least one narrow circulation passage between said working chambers when said rigid devices are displaced one in relation to the other, in order to produce a damping of the relative displacement of said rigid devices; and means for the absorption of the thermal expansion of the hydraulic fluid.

In this type of strut, also called a drag damper or frequency adapter, described in French Patent No. 2 528 382, the mass of the deformable material is a ring made of a viscoelastic material adhering by its two front surfaces to two rigid plates bolted one onto the other and onto a brace so as to constitute the rigid device which is unitary with the blade and in such a way that the brace is shaped in the form of an attachment bracket which supports a mounting ball-joint, while the second rigid device, mounted on the rotor hub by a ball-joint, has one part in the shape of an annular plate embedded in the thickness of the viscoelastic ring and around a central, oblong recess in this ring, in which a restrictive element is housed, delimiting together with the lateral wall of the central recess of the ring, the two working chambers having volumes varying in opposition. and two narrow circulation passages between the two working chambers. The restricting element is formed by the bolting of the substantially cylindrical central portions, one against the other of the two rigid parts, each of which has a circular plate housed in an opening in one of the two rigid plates of the device connected to the blade, in order to close the central hollow of the viscoelastic ring. The means for absorbing the thermal expansion of the hydraulic fluid are housed in the restricting element and are composed of two pairs of inner chambers, each of which contains a manometric capsule; the two chambers of each pair are connected to a single narrow duct which opens out at the mouth of one of the two narrow circulation passages between the working chambers.

In-flight experimentation on helicopters of medium tonnage of a main rotor comprising a new-generation hub and equipped with resilient return drag struts of the viscoelastic and hydraulicelastic type, such as those described in French Patent No. 2 528 382, has demonstrated that it was desirable to increase the damping produced by these resilient return struts, in order to properly provide the damping effect over a flight range which has been enlarged as regards weight and especially speed of which these modern helicopters, equipped with a new-generation rotor hub, are capable. However, the increase in damping applied to these resilient return struts brings with it a correlative increase in their rigidity which is incompatible with a satisfactory mechanical resistance of the means used to attach these struts to the rotor hub.

In order to correct these problems, French Patent No. 2 592 696 proposed that, in a strut of the type described above, the mass of the deformable material of the resilient return device be a cylindrical sleeve made of an elastic material, which also forms a sealing joint of the hydraulic damper, and that this sleeve be made to adhere in a water-tight manner by its inner and outer surfaces between two tubular metal cylinders which are coaxial in relation to the axis of the strut, each of these cylinders being unitary with one of the two rigid components. The hydraulic damper comprises, in addition to a piston mounted so as to slide axially in a cylinder carrying one of the rigid components and which separates one from the other the two working chambers marked off in this cylinder, a longitudinal shaft rod parallel to the axis of the strut which renders the piston unitary with the other rigid component while extending through at least one of the working chambers, as well as a compensation chamber placed between, first, a cylinder base adjacent to a working chamber through which the rod passes, and, second, a lateral surface of the cylindrical resilient sleeve and the inner lateral face of the inner tubular cylinder. This compensation chamber contains a volume of hydraulic fluid as well as a volume of gas, which constitute said means for absorption of the thermal expansion of the hydraulic fluid; in addition, it is designed to compensate for the difference between the variations in volume of the two working chambers, which results from the rod when the piston is displaced in the cylinder. Finally, the hydraulic damper contains a compensation device by which the compensation chamber is connected to each of the working chambers in order to allow for a flow of hydraulic fluid from one of the working chambers and toward the compensation chamber when the piston is displaced in one direction, and a flow of hydraulic fluid from the compensation chamber toward a working chamber when the piston is displaced in the cylinder in the other direction.

Since the sliding movement of the piston in the cylinder is accomplished in a water-tight manner, the narrow feeding passage between the two working chambers is a passage provided in the piston and in which a restriction device is installed. Furthermore, excess-pressure valves are also installed in ducts arranged through the piston in order to connect the two working chambers together, and to allow a flow of hydraulic fluid from the one of the working chambers which is pressurized, when the piston is displaced in the cylinder, toward the other working chamber which has been depressed, as soon as the differential pressure between the two working chambers exceeds a given threshold. In addition, the compensation device is housed in a compensation duct which is, itself, set in the piston, in such a way that each of its two ends are continuously connected to one of the two working chambers, and that one substantially central portion of this compensation duct is permanently connected to the compensation chamber by means of a compensation conduit extending into the piston shaft. The compensation device is a dual valve comprising two movable seals, each of which cooperates with one of two receptacles against which it is lodged in water-tight fashion by the pressure existing in one of the two working chambers, when this chamber is pressurized by displacement of the piston in the cylinder, while the other seal is drawn away from its receptacle so that the other working chamber may be connected to the compensation chamber.

An arrangement of this kind requires that the rod be guided. This function is provided by a bearing installed in a cylinder base adjacent to a working chamber equipped with mechanical packing and through which the rod passes.

The disadvantages of such a strut are, first, that its internal structure requires the use of complex valves, parts sensible to wear, and various devices which cooperate with each other while possessing slight relative play; and, second, that watertightness is obtained only with the careful installation of the sliding piston and the rod connected to this piston.

SUMMARY OF THE INVENTION

The object of the invention is to propose a resilient return strut of the hydraulic-elastic type having incorporated damping which performs the same functions and has the same advantages as the strut described in French Patent 2 592 696, without the above-mentioned disadvantages.

In other words, the invention's purpose is to propose a resilient return strut of the hydraulic-elastic type with incorporated linear damping, by throttling a hydraulic fluid, which enables a single device to perform two functions: first, the resilient return of the blade under the effect of drag, accomplished by the shearing of a mass of elastically-deformable material (natural, synthetic, or silicone rubber) which provides rigidity when subjected to drag; and, second, damping, which is provided by a hydraulic damper, since the strut according to the invention make it possible to adjust the natural frequency under conditions of drag of the corresponding blade and its damping when this type of angular oscillations occurs, i.e., the dynamic drag characteristics of the blade. Simultaneously, since it is proposed to use as hydraulic fluid a high-viscosity fluid, in particular a silicone-based fluid, the invention's purpose is to propose a strut having a simplified structure which is compatible with the use of a high-viscosity fluid of this kind, thus making it possible to increase manufacturing tolerances; to use simple and economical valves; to accept a considerable throttling play because of the high viscosity of the hydraulic fluid, thus leading to the reduced effect of manufacturing tolerances on damping characteristics; to provide under the best conditions the total water-tightness of the damper; and, finally, to avoid the use of wear sensible parts. As a result, the strut according to the invention necessarily has better reliability and a longer life, as well as a lower manufacturing cost than the struts equipped with dampers using low-viscosity hydraulic fluid which are now used to provide resilient return and the damping under conditions of drag of the hinged blades of the rotors which support helicopters.

For this purpose, the resilient return strut of the hydraulic-elastic type with incorporated linear damping by throttling a hydraulic fluid, in accordance with the invention, is of a well-known type as described by French Patent 2 592 696 serving to connect a blade of an aerodyne rotor to the rotor hub. It comprises:

two rigid devices, each equipped with hinging means designed to connect one of the rigid devices to a first part, such as a blade or a device for connecting said blade to a rotor hub, and the other rigid device to a second part, such as said rotor hub;

a hydraulic damper, containing two damping chambers of variable capacity varying in opposition, which are set off within a tubular body unitary with one of the two rigid devices and separated one from the other by a transverse wall which forms a piston, mounted in the tubular body, and which is also unitary with one of the rigid devices; these damping chambers are filled with a hydraulic fluid which is intended to flow from one to the other of the damping chambers through at least one narrow feeding passage between the chambers when the rigid devices are displaced one in relation to the other, substantially along the main axis of the strut, in order to produce a linear damping of the relative displacement of the rigid devices;

a device which compensates for thermal expansion of the hydraulic fluid, which incorporates an auxiliary chamber containing a volume of hydraulic fluid and permanently connected with at least one of the damping chambers through a damper base which partially marks off the auxiliary chamber and is adjacent to a damping chamber; and at least one resilient return device, comprising a sleeve made of an elastically-deformable material which is secured so as to be water-tight by its inner and outer lateral surfaces, respectively, between two rigid, tubular sections, internal and external respectively, which are substantially coaxial along the main axis of the strut, and each of which is unitary with one of the two rigid devices, respectively, in such a way that the sleeve is deformed by shearing when the two rigid devices are displaced one in relation to the other, substantially along the main axis of the strut, and that the sleeve exerts on said rigid devices an effect of resilient return tending to bring them back to an initial relative position, while this sleeve also forms a water-tight locking joint of the hydraulic damper.

In accordance with the invention, a strut of this kind is characterized by the fact that the damping chambers are marked off in the axial direction between two elastic return devices, whose external rigid tubular sections are arranged longitudinally on either side of the tubular damper body, are substantially coaxial one to the other and to the tubular body, and are unitary with this body while forming a single external tubular armature which is unitary with one of the two rigid devices; the rigid internal tubular sections of the elastic return devices are substantially coaxial one with the other and arranged longitudinally separated by spacing and on either side of said transverse wall of the damper and unitary one with the other as well as with the other rigid device with which the external tubular armature is not unitary, while forming a single internal armature, comprising a central part which passes axially through the two damper chambers and secures the two internal tubular sections to each other while being enclosed by the transverse wall, which is ring-shaped and unitary with one of the armatures, and in such a way that each of the sleeves made of an elastically-deformable material of the resilient return devices provides for the water-tight sealing of one of the two damper chambers, respectively, on the side opposite to the transverse wall, while in such an arrangement the damper chambers are permanently connected one with the other by a narrow ring-shaped passage formed by a throttling radial play between the transverse wall and that one of the armatures, with which the transverse wall does not form a one-piece unit, and through which the high-viscosity hydraulic fluid is throttled, while being contained within the damper chambers and the auxiliary chamber of the device providing compensation for the thermal expansion of this fluid.

A structure of this kind makes it possible to give to the throttling radial play a relatively high value because of the high viscosity of the hydraulic fluid used, in such a way that manufacturing tolerances may be relatively wide, without entailing any unfavorable effect on the damping characteristics.

The definition of the throttling radial play will be facilitated if, in an advantageous arrangement, the ring-shaped transverse wall is made unitary with the external tubular armature, and is extended in the form of a substantially radial projection toward the interior of the central part of this external armature, which forms the body of the damper, in such a manner that the internal radial edge of the ring-shaped wall demarcates the ring-shaped throttling passage around the central portion of the internal armature.

In this case, and in a simplified embodiment of the internal armature, this armature contains a longitudinal brace which maintains a uniform axial gap between two damper bottoms, each of which is adjacent to one of the damper chambers, respectively, and unitary with one, respectively, of the internal tubular sections, thus causing the annular throttling passage to be set off between the annular transverse wall and the external lateral surface of the brace. This embodiment also makes it possible to arrange the device so that the radial throttling play between the wall and the armature with which the wall is not unitary, is play which is variable as a function of the axial position of the wall in relation to this armature, in order to bring about a variable damping as a function of load. Indeed, when the radial throttling play is set off between the internal radial edge of the annular wall and the external lateral surface of the internal armature, the external lateral surface may have a substantially truncated or even biconical shape in the direction of at least one axial end of the damper.

In this strut, the rigidity required is provided by the resilient return devices, whose sleeves, made of an elastically-deformable elastomer material such as natural rubber, are sheared, first as a result of the relative displacement of the external and internal armatures, and, second, as a result of the internal hydraulic pressure of the damper. The damping function is provided by the throttling of the high-viscosity fluid through the annular passage marked off by the radial play between the annular transverse wall and the armature with which this wall is not unitary, and, preferably, between the wall attached to the external armature and a brace of the internal armature, as explained above.

To avoid the transmission of excessive stresses from one rigid device to the other in the event of an excessive axial load on the strut, the hydraulic damper of the strut comprises at least one device for the limiting of the damping stress, which contains at least one discharge valve designed to allow leakage to flow from one of the damper chambers, which is compressed by a relative axial displacement of the two rigid devices toward the other damper chamber in which the pressure in then being reduced, as soon as the differential pressure between the two damper chambers exceeds a given threshold.

The presence of a limiting device is important, since it allows the radial throttling play to be proportioned so as to provide pronounced damping and, therefore, considerable axial stress, which is required to resist the phenomenon called "ground resonance" at low amplitudes of the relative displacement of the rigid devices (e.g., from 0 to 1.5 mm), while a limiting of the damping stress is demanded beyond these amplitudes, in order to limit at cruising speed the stresses exerted on the mechanisms which provide for the attachment and the hinging of the strut onto the blade and the hub.

In order to ensure the limitation on damping stress when both compression and traction are exerted on the strut, the stress-limiting device comprises at least two discharge valves, of which at least one allows for leaking to flow from a first damping chamber to the second chamber when the pressure in the first chamber is greater than a first threshold above the pressure in the second chamber, and prevents any flow of the high-viscosity fluid in the opposite direction, i.e., from the second chamber to the first, while at least one other discharge valve permits leakage to flow from the second toward the first chamber when the pressure in the second chamber is greater than a second threshold above the pressure in the first chamber, and prevents any flow in the opposite direction, i.e., from the first to the second damper chamber. The first and second thresholds may be different if a variation in the limiting action under conditions of compression and traction is desired, but these two thresholds are equal one to the other if such a variation in action is not desired. Furthermore, the use of a high-viscosity fluid as a hydraulic fluid makes possible the use of discharge valves having a simplified structure, for example, valves equipped with a prestressed movable seal which is normally repositioned so as to seal at least one limiting orifice connecting the two damping chambers with each other, but is drawn away from the sealing position as soon as the differential pressure to which it is sensitive exceeds the corresponding assigned threshold.

In a particularly simple and efficient embodiment, at least one limiting orifice is a hole drilled in the transverse wall, and the corresponding movable seal is a spring-leaf, of which at least one portion, which forms a diaphragm, is housed in one of the damping chambers, and this seal, which is elastically prestressed, is set in position sealing the hole and against the surface of the wall which faces this damper chamber, while the hole is progressively unblocked by elastic flexion of the spring-leaf and displaced toward the interior of this damper chamber, which houses it at least partially, thereby freeing a passage which is complementary to the ring-shaped throttling passage and increasing the high-viscosity fluid-throttling section when the pressure in the damping chamber in question is inferior than the pressure in the other damper chamber of a value equivalent to the corresponding assigned threshold. To facilitate the mounting of the discharge valve on the transverse wall, the spring-leaf of this discharge valve is, advantageously, attached to the surface of the transverse wall facing the damping chamber toward the inside of which the spring-leaf is flexed when the corresponding discharge valve is opened.

To provide for the limiting of the damping stress in the two directions in which stress is exerted on the strut, under conditions of both traction and compression, the limiting mechanism comprises, advantageously, several holes drilled in the transverse wall, to each of which a discharge valve equipped with a prestressed spring-leaf is connected, and the discharge valves are installed on each side of the wall, in such a way that the spring-leaves in all of the valves allowing fluid flow in a single direction from one damper chamber to the other, are all attached to the surface of the transverse wall which is turned toward the damper chamber in which these spring-leaves are flexed.

To facilitate the construction of the damper and the mounting of the spring-leaves, advantage is gained by providing that the spring-leaves attached to a single surface of the transverse wall be such that, in the non-flexed position, they extend in substantially radial fashion against this surface. Furthermore, the simultaneous mounting of several spring-leaves is facilitated if at least two of them, arranged on the same side of the transverse wall, are unitary with a common seat, in relation to which the spring-leaves are designed to bend elastically and which is attached to the surface of the wall which faces this side.

The correct installation of the spring-leaves is facilitated still more if, in addition, all of the spring-leaves mounted on the same side of the transverse wall are of a single piece cut from sheet-metal, and have a flat, ring-shaped collar attached in a movable manner against a ring-shaped, radially-positioned external part on the corresponding surface of the wall and in the interior of the damper frame, and if, simultaneously, each spring-leaf is connected to said collar by its base which is formed between two recesses cut in the inner radial edge of the collar, while each spring-leaf extends toward the inside of this collar up to its free end, which forms a diaphragm, positioned opposite a limiting hole in the wall.

In addition, in order to reduce the number of components needed for construction of the strut, and especially of the strut damper, conventional means of attachment may be used to attach to the wall at least one spring-leaf set on one side of this wall, and at least one spring-leaf set on the other side of the wall.

In accordance with the most effective embodiment of the limiting valves, the wall is drilled with an even number of limiting holes, preferably regularly-spaced circumferentially around the axis of the strut, and one-half of the same even number of spring-leaves is installed one each side of the wall, in such a way that the spring-leaves on each side of this wall cooperate with one-half of the holes arranged in alternating fashion circumferentially with the holes cooperating with the spring-leaves installed on the other side of the wall. Furthermore, the spring-leaves are composed of two identical subassemblies, each of which is attached to one of the two surfaces, respectively, of the transverse wall by the same screw-nut units, and these two sub-assemblies are each made of a single sheetmetal piece, each of which is offset circumferentially in relation to the other by an angle at center equal to the ratio of 360° to the number of limiting holes drilled in the transverse wall.

If, in consideration of its preferred application to the connection of a rotor blade to the rotor hub, it is necessary to increase damping in cases of heavy loads and when there exist large amplitudes of relative axial displacement of the two rigid devices, advantage is gained, according to the invention, by providing that the hydraulic damper of the strut comprise, in addition, at least one device for saturation of the fluid flow from at least one discharge valve, in which case this saturation device limits the leakage when the differential pressure between the two damping chambers reaches another assigned threshold which is greater than that (or those) at which the discharge valve(s) open(s).

In one especially simple embodiment, the device providing saturation of the leakage from at least one discharge valve comprises a mechanism comprising at least one stop which restricts the motion of the movable seal of the discharge valve when this seal is drawn away from its sealing position of one or more corresponding limiting holes. In an advantageous embodiment, the stop is a block fastened to one surface of the transverse wall, which overlaps at least partially a leaf-spring which constitutes the seal of the discharge valve in question, in such a way that the spring-leaf is at least partially housed between the block and the above-mentioned surface of the wall, and that the deflections of the spring-leaf in a flexed position are restricted by its abutment against this block.

In this embodiment, advantage is gained, in order to limit still more the number of parts for the damper, by fastening at least one spring-leaf and at least one block acting as a stop restricting the flexion of this spring-leaf, against the wall by common fastening means. In particular, when the spring-leaves mounted on each side of the wall are made of a single piece and with a ring-shaped collar, as described above, it is advantageous to have a block constituting a single stop for all of the spring-leaves mounted on the same side of the wall, which has the form of a ring-shaped washer which is rigidly set against said ring-shaped collar with which these spring-leaves are unitary. The ring washer may also preferably comprise radial arms projecting inward and covering the spring-leaves while having opposite to these latter, areas of support shaped to match the elastic line of the spring-leaves in a flexed position corresponding to a differential pressure equal to the threshold at which the saturation of the leakage is to be triggered.

Using a strut of this kind, it is possible to obtain a level of damping which is pronounced at low amplitudes (e.g., lower than 1.5 mm of relative displacement between the rigid armatures, each of which is connected to one of the rigid devices between which the strut is interposed) and at large amplitudes (e.g., greater than 4.5 mm under the same conditions), thus providing satisfactory performance of the apparatus on the ground and in flight, respectively, when the blades are subjected to heavy loads. On the other hand, the level of stress borne by the strut under these conditions has negative consequences for the life of the mechanical components of its structure. Since the intermediate amplitudes (e.g., from 1.5 to 4.5 mm of relative displacement of the armatures) correspond to a substantially stabilized flight configuration and to the cruising speed at which a high level of damping is not required, it appears quite desirable to reduce the level of stress to which the strut is subjected at intermediate amplitudes. Thus, the initial choice of limiting orifices having a relatively large transverse section, which cooperate with spring-leaves whose range of motion is restricted after a predetermined flexion movement in order to saturate the leakage through each limiting orifice, will make it possible to obtain the low level of damping sufficient for flight at cruising speed. On the other hand, to increase the slope of the curve providing the damping stress as a function of the movement of relative displacement of the strut armatures beginning at a low threshold in the high-amplitude range (e.g., 4.5 mm), advantage is gained, according to the invention, by equipping the hydraulic damper with at least one pressure-driven, limiting-suppression device, which controls the interruption of leakage of at least one discharge valve when the differential pressure between the two damping chambers reaches yet another given threshold which is greater than the different thresholds mentioned previously.

In order to produce a limiting suppression device having a simple structure and which is not bulky, the device should preferably comprise a closing valve equipped with a movable seal which is shifted from a disengaged position in relation to at least one limiting orifice in at least one discharge valve to a sealing position closing the limiting orifice(s) in this valve, when the differential pressure reaches the upper threshold mentioned previously.

According to the best known embodiment, the closing valve is carried by the transverse wall in such a way that its movable plug is positioned so as to seal at least one limiting hole drilled in this wall. In addition, the movable seal of the closing valve is, advantageously, mounted as a water-tight slide valve in a transverse hole set in the wall which intersects a limiting hole; the transverse hole is, on either side of the slide valve, permanently connected with one of the two damping chambers, respectively, in such a way that the pressures in these chambers are continuously exerted on the ends of the slide valve, which is brought back elastically into a position of disengagement with the limiting hole by at least one elastic mechanism, preferably also housed in the transverse hole, and that the slide valve is pushed back in the direction counter to the elastic mechanism in the position in which it seals the limiting hole when the differential pressure between the two chambers reaches the upper threshold previously mentioned and generates on the slide valve a stress greater than the prestressing of the resilient return device. In this way, if a limiting-suppression device is combined with each discharge valve, the hydraulic damper incorporates a device for the restoration of the initial throttling by means of the annular throttling passage, when the differential pressure between the two chambers exceeds the above-mentioned higher threshold.

However, in a strut having this structure, it is possible that the deformation by shearing of the sleeves made of an elastically-deformable material of the resilient return devices, subjected to the effect of the internal dynamic pressure of the damper, brings about a decline in the damping characteristics which is too considerable to be accepted, given the loads borne by the rotor blade which the strut is designed to connect to the corresponding rotor hub.

In tis case, and according to a feature peculiar to the invention, each of the two damping chambers marked off on either side of the transverse wall in the tubular frame of the damper is, advantageously, subdivided, buy means of a rigid transverse wall which is unitary with that of the two armatures with which the transverse partition is not in one piece, into two chambers of which one, in an internal axial position and adjacent to the transverse partition, is a working chamber functioning under dynamic pressure, and the other, in an external axial position and directly adjacent to the elastically-deformable sleeve on the corresponding side, is a chamber which compensates for variations in volume linked to deformation of the elastically-deformable material, and which is permanently connected to the other, similar type of chamber in the external axial position, by means of at least one connecting conduit. This arrangement makes it possible to simultaneously compensate for variations in volume due to the deformations of the elastically-deformable material and avoid making this elastically-deformable material function under pressure. A connecting conduit of this kind joining the two chambers in the external axial position, i.e., joining the two chambers adjacent to the two elastically-deformable sleeves, may be a pipe on the outside of the damper frame to which it is connected by its two ends. However, this connecting conduit may also be formed by making at least one essentially longitudinal duct within the thickness of the damper body.

In the embodiment which is made advantageously simple, in which the transverse partition is unitary with the damper body and, therefore, with the external tubular armature, the transverse walls providing for separation between the functional chambers operating under dynamic pressure and the chambers adjacent to the deformable elastic material may be dishes substantially disk-like in shape which are held in stationary positions and separated axially one from the other on the internal armature by means of a brace composing this armature. The brace secures each of these dishes against one of two substantially-radial damper bases, each of which is unitary with one of the two internal tubular sections, respectively, of the resilient return devices. However, these transverse walls are, advantageously, pistons mounted so as to slide in water-tight fashion against that one of the two armatures with which the pistons are not unitary, i.e., against the armature with which the transverse partition is in one piece, therefore, by preference, the external tubular armature. In this case, each of the pistons is unitary with one of the internal tubular sections, respectively, and they slide in water-tight fashion on the inside of the tubular damper body.

In such a configuration, at least one of the two pistons may be unitary with an internal tubular section as well as with a closing plate in the internal axial end of this section. But it is also possible to construct at least one of the two pistons by using a movable assembly composed of an external radial collar which is unitary with an internal tubular section, and of an external radial collar unitary with a base-plate mounted on the internal, axial end-piece of this internal tubular section.

Furthermore, the device compensating for the thermal expansion of the high-viscosity fluid may, advantageously, be integrated into the strut if this compensation device is embodied as an accumulator in which the auxiliary chamber is filled with fluid and pressurized by a pressurization device which functions to fill under static pressure the two damping chambers. To insulate the auxiliary chamber from the dynamic pressure pulsations in the damper chambers, the permanent connection between at least one damper chamber and the auxiliary chamber is advantageously achieved by means of a duct which is calibrated over at least a portion of its length and which constitutes a filter for the dynamic pressure pulsations. This calibrated duct may pass through the damper bottom which partially marks off the auxiliary chamber and empties directly into the damper chamber of which the bottom is adjacent. However, in the event that the transverse partition is unitary with the external tubular armature and marks off the permanent annular throttling play between its internal radial edge and the internal armature, the calibrated portion of the duct may be at least one radial hole drilled in the central portion of the internal armature, which opens out, on one side, in the annular throttling play, and on the other side, in a longitudinal conduit extending into the internal armature and beyond a damper bottom unitary with an internal tubular section and emptying into the auxiliary chamber housed in this internal tubular section.

However, in the event that the damper chambers are subdivided into functional working chambers under dynamic pressure and into compensation chambers connected to each other by means of at least one longitudinal conduit arranged in the damper body, the calibrated portion of the duct may have at least one essentially radial hole drilled into the transverse, annular partition, which opens into a longitudinal passage set into the thickness of the damper body, and into said annular throttling passage.

However the calibrated duct is arranged, the auxiliary chamber is, advantageously, also insulated from the dynamic pressure pulsations in the damper chambers by means of, first, an excess-pressure valve which is calibrated to a cut-in pressure greater than the maximum pressure produced under normal operation of the damper, in order to allow the flow of fluid from at least one damper chamber toward the auxiliary chamber as soon as the pressure in said damper chamber is greater then the cut-in pressure; and, second, a supercharging valve calibrated to another cut-in pressure lower than the pressure of the fluid in the auxiliary chamber subjected to the action of the pressurization device, in order to provide a constant resupply of the damper chambers, which must always be filled.

In one simple embodiment, the excess-pressure valve has at least one spring-leaf housed in the prestressed, auxiliary chamber and set against the damper base which partially defines this auxiliary chamber, in such a way that the spring-leaf is in position to seal off at least one orifice which passes through this damper base and connects the auxiliary chamber to the damper chamber adjacent to this base.

In a similar manner, the supercharging valve will advantageously have at least one spring-leaf housed in the damper chamber adjacent to the damper base which partially defines the auxiliary chamber, and this spring-leaf is prestressed against the damper bottom set in position to seal off at least one orifice which passes through this base and connects the auxiliary chamber with the damper chamber housing the corresponding spring-leaf.

In the accumulator incorporated into the strut to provide for compensation of the thermal expansion of the high-viscosity fluid, the auxiliary chamber is advantageously partially marked off by an elastically deformable bottom, composed of a wall made of an elastomer which provides water-tightness and is elastically returned to a position in which it compresses the fluid in the auxiliary chamber, or of a flexible and water-tight diaphragm subjected to the action of an elastic device of the pressurization mechanism. This latter may be a pneumatic device of which the elastic mechanism is a volume of pressurized gas contained in a pneumatic chamber which is partially marked off by the flexible, water-tight diaphragm.

In this case, the auxiliary chamber is preferably defined within the internal tubular section of a resilient return device, between a base sealing off the internal axial end of this section and the water-tight diaphragm; this diaphragm has a cup-like shape and is attached by its peripheral edge in a water-tight manner in this internal tubular section, thus producing an arrangement in which the pressurized pneumatic chamber is set between the diaphragm and a cover which closes off the external axial end of this same internal tubular section.

To provide for the indication of the filling level of the auxiliary chamber, the compensation device thus formed may advantageously contain an indicator equipped with an indicator stick, of which one end is unitary with the central portion of the diaphragm and which is mounted so as to slide axially in a tube which is at least partially transparent and projects outward from the cover, on which an inflation valve for the pneumatic chamber is, preferably, also mounted.

However, the pressurization device may also be mechanical, in which case, according to a simple embodiment, its elastic mechanism is either a spring which pushes a piston against the flexible, water-tight diaphragm, or an elastomer-based ring providing both the water-tightness and the elasticity of the device and constituting an elastically deformable bottom of the auxiliary chamber, as already mentioned.

In the first instance, the auxiliary chamber is advantageously set off inside an internal tubular section of a resilient return device, between a damper bottom unitary with the internal axial end of this tubular section and a diaphragm of the unwinding type, and whose central part is set against the piston mounted in an axially sliding configuration, without being water-tight, in this tubular section, which also houses the spring. The piston which pressurizes the diaphragm is guided in its axial displacement by a central shaft which is unitary with it and which is, furthermore, mounted axially in a sliding arrangement with slight radial play inside of a tubular brace which maintains a uniform axial gap between the above-mentioned damper bottom and another damper bottom unitary with the internal axial end of the internal tubular section of the other resilient return device.

Also in this embodiment, the expansion-compensation device comprises, advantageously, a filling-level indicator for the auxiliary chamber; this indicator has an indicator-stick unitary with the pressurization piston which extends longitudinally outward through a base which closes off the external axial end of the internal tubular section which houses the diaphragm, the piston, and the spring, and against which rests this piston thrust spring.

As regards the overall structure of the strut, and according to a first preferred embodiment, the external tubular armature comprises the rigid, dismountable assembly composed of two cylinders having the same transverse section, which lie so as to extend each other axially and are secured substantially end-to-end by facing end-flanges, and between which at least one peripheral radial part of the transverse partition is enclosed in such a way that the adjacent end-pieces of the two cylinders form the tubular damper body and that the other end-piece of each of them forms the external tubular section of a resilient return device. In addition, one of the two cylinders comprises, preferably at its end opposite to the one by which it is made adjacent to the other cylinder, another rigid, dismountable flange mounting it onto the rigid device which is unitary with the external armature, and preferably constructed in the form of a bell having a tip equipped with a fastening eye on a ball joint, which form the corresponding means of jointing.

However, according to another preferred embodiment, the external tubular armature may contain a central cylindrical body which is unitary with the transverse partition and forms the tubular damper body by presenting two axial end-pieces, into each of which is fitted and held a cylinder constituting the external tubular section of one of the resilient return devices. One of the axial end-pieces is simultaneously rigidly attached to the rigid device unitary with the external armature, and is preferably constructed in the form of a bell having a cap equipped with a fastening eye on a ball joint, which, in this case also, form the corresponding means of jointing.

As regards the internal armature, this comprises, advantageously, in addition to two internal tubular cylindrical sections, at least one radial base through which a central hole is drilled and which is unitary with a internal tubular section, and at least one axial support and an axial brace, in which arrangement the brace hold at least one radial base against a radial stop carried by the axial support which passes in water-tight fashion through the central hole in the radial base.

This radial stop may be unitary with the axial support, or again, it may be a movable stop which comprises, for example, a nut screwed onto a threaded portion of the corresponding axial support. This latter may, in this case, be an axial pin inserted into the brace, which is in this instance tubular. A pin of this kind may form one piece with the rigid device which is unitary with the internal armature, and possibly be shaped as a connection-piece having a fastening eye on a ball joint, thereby constituting the corresponding means of jointing.

But it is also possible to have the axial support be an axial end-portion of the brace, which would advantageously in this case be partially threaded and connected to the rest of the brace by a shoulder, against which a radial bottom is advantageously clamped by means of a nut screwed on this portion of the axial end of the brace. Furthermore, at least one of the two radial bottoms may form one piece with an internal tubular section of a resilient return device. However, it is also possible to have at least one of the radial bottoms, which might, for example, be unitary with the brace, mounted on such an internal tubular section. Finally, the rigid device unitary with the internal armature may be in the form of a bell having a cap equipped with a fastening eye on a ball joint and made unitary with the internal tubular section of one of the resilient return devices.

These various embodiments produce struts requiring reduced manufacturing costs because of a structure made up of the assembly of components which has large manufacturing tolerances, while still guaranteeing the total water-tightness of the damper, and integrated compensation for thermal expansion of the high-viscosity fluid, and which permits the use of valves having a simple and reliable structure without expendable components, thereby guaranteeing high reliability and durability. Furthermore, the high-viscosity fluids which may be used have the advantage of properties which are significantly more stable as a function of temperature than the hydraulic fluids normally used in aviation-quality dampers.

BRIEF DESCRIPTION OF THE DRAWINGS

The present invention will be better understood and other advantages and features of the invention will emerge from the description given below of several non-limiting embodiments described with reference to the attached drawings in which:

FIG. 4 also shows, in broken lines, a stop restricting the flexion of the four spring-leaves;

DESCRIPTION OF THE PREFERRED EMBODIMENTS

Figure 1:
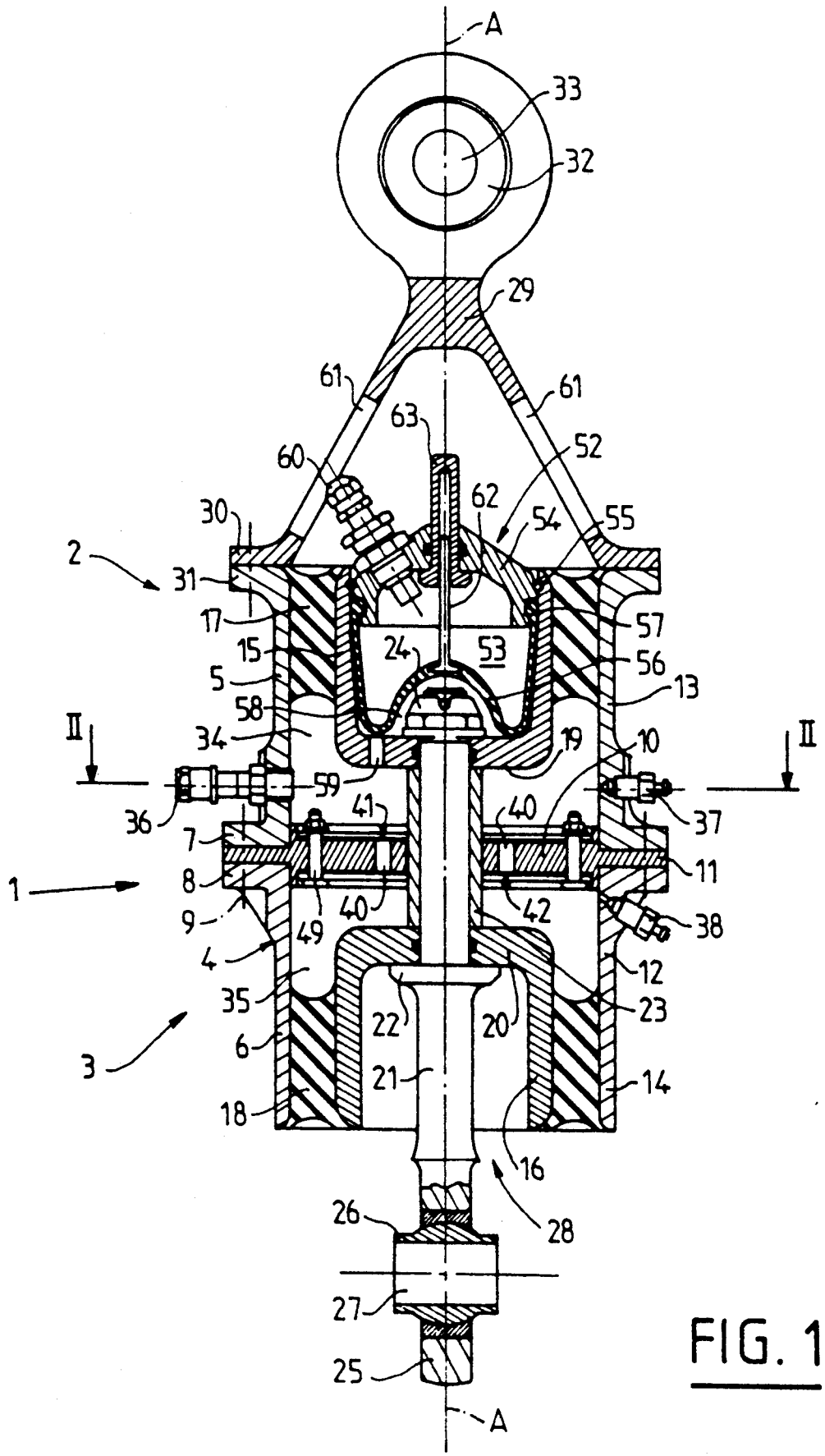
FIG. 1 is an axial and longitudinal sectional view of a first embodiment of the strut according to the invention.

The resilient return strut of the elastic-hydraulic type having incorporated linear damping, as shown in FIG. 1, basically comprises a hydraulic damper 1 throttling a high-viscosity fluid, which is mounted in a central position between two elastic return springs 2 and 3 mounted together in an axially-arranged series and on each side of the damper 1. The assembly is set inside a rigid external tubular armature 4 composed of the bolted, dismountable assembly of two metal tubular truncated cylinders 5 and 6 having a circular transverse section and internal holes of the same diameter. The two truncated cylinders 5 and 6 are coaxial around the longitudinal axis A—A of the strut and arranged so as to axially extend each other and are held substantially end to end by two external, radial collars 7 and 8, each of which is unitary with the internal axial end of one of the truncated cylinders 5 and 6, i.e., the axial end which is the closest to the other truncated cylinder. The two truncated cylinders 5 and 6 are secured to each other by the two collars 7 and 8, which are clamped one to the other by a ring composed of screw-nut assemblies which are schematically represented by their axis lines 9 and are evenly spaced on the periphery of the collars 7 and 8 and around the axis A—A, and the two collars 7 and 8 enclose between them a peripheral annular bevelled flange 11 forming part of a rigid, ring-shaped transverse partition 10, which is thus made unitary with the external armature 4. The fastening screws on the collars 7 and 8 preferably also pass through this flange 11. The partition 10 extends radially within a tubular damper body 12 formed by the internal axial end-pieces of the cylinders 5 and 6, which extend over approximately half of the axial dimension of these cylinders 5 and 6, and by means of which these cylinders 5 and 6 are positioned so as to be substantially adjacent to each other, and the internal radial part of the partition 10, which has a greater axial thickness than its flange 11 in an external radial position, is housed and centered in the holes of the cylinders 5 and 6 in such a manner that it is coaxial to the cylinders 5 and 6 around the axis A—A. The partition 10 thus makes up an annular damper piston which is unitary with the tubular body 12 of the damper 1, the structure of which will be described more fully below.

Each of the two return springs 2 and 3 is composed of an external cylindrical tubular section, 13 and 14 respectively, marked off by the external axial end-piece of the cylinder 5 or 6 on the corresponding side, i.e., by the axial end-piece extending over approximately half of the axial dimension of the cylinder 5 or 6, and on the side opposite to the partition 10; each also comprises an internal metal tubular cylindrical section, 15 and 16 respectively, having a circular transverse section and connected to the corresponding external cylindrical section 13 or 14 by a tubular sleeve 17 and 18 made of an elastically-deformable material. Each sleeve 17 or 18, which is produced by molding, is made of an elastomer, e.g., of a natural rubber, and is made to adhere, by vulcanization of its lateral surfaces, internal and external respectively, against the external lateral surface of the corresponding internal cylindrical section 15 or 16 and against the internal lateral surface of the corresponding external cylindrical section 13 or 14. In this way, each elastomer-based sleeve 17 or 18 may be elastically deformed by shearing between the two rigid, tubular cylindrical sections which the sleeve connects together coaxially. Each internal cylindrical section 15 or 16 is, at its internal axial end, made unitary with a radial bottom 19 or 20, through which a central, axial hole is drilled having an internal peripheral groove which houses a water-tight toric seal, in such a way that the bottoms 19 and 20 may be mounted in water-tight fashion on a central, axial shaft 21. This shaft 21 has a shoulder 22 which forms a stationary stop on the shaft 21, and against which the sealing base 20 of the internal cylindrical section 16 is kept secured and at a distance axially from the partition by means of a tubular brace 23, which is fitted around the shaft 21 and centered around the axis A—A while passing through the central hole of the annular, transverse partition 10 with calibrated radial play. This tubular brace 23 also keeps the sealing bottom 19 of the internal cylindrical section 15 at a distance axially from the partition 10 and in a stationary axial position on the shaft 21 through cooperation with a movable stop comprising a nut 24 which is screwed and cottered on a threaded end of the shaft 21 extending beyond the bottom 19 and within the internal cylindrical section 15 of the return spring 2. On the other side, beyond the stationary stop 22, the shaft 21 extends axially into the internal cylindrical section 16 of the return spring 3 and beyond the external axial end of this internal section 16 by means of a rigid end-cap 25 equipped with a ball joint 26 having a fastening eye 27.

Thus, the internal cylindrical section 16 with its base 20, the brace 23, and the internal cylindrical section 15 with its base 19 may be successively stacked on the shaft 21, then fixed in axial position on this shaft 21 by screwing the nut 24 so as to form, in conjunction with this shaft 21, a rigid internal axial armature 28 which may be attached and jointed by its end-cap 25 equipped with a fastening eye 27 on the ball joint 26 to a helicopter rotor hub.

On the side of the other axial extremity of the strut, the external tubular armature 4 is unitary with a joining piece 29 in the shape of a substantially tapered bell, of which the broad base is open and has an external radial collar 30 removably attached by bolt connections, using a ring of screw-nut assemblies (not shown), against an external radial collar 31 forming a part of the external axial end of the truncated cylinder 5, while the small base of the bell-shaped joining piece 29 is closed and carries a ball-joint 32 equipped with a fastening eye 33, by which the external armature 4 of the strut may be attached and jointed to the base of a rotor blade or to a sleeve or yoke connecting the base of the blade to the rotor hub.

In the strut, whose principal structural elements have just been described and such that the two cylindrical sections 15 and 16 of same external diameter, the two external truncated cylinders 5 and 6, the brace 23, and the shaft 21 are coaxial around the axis A—A, two damper chambers 34 and 35 are set off in the damper body 12 on either side of the partition 10, and each of these chambers is closed off axially on the side opposite to the partition 10 by one of the elastic return springs 2 and 3. The two chambers 34 and 35 are filled with a high-viscosity fluid, which is introduced into the damper 1 through a filling valve 36, which is mounted in the truncated cylinder 5 and which empties into the chamber 34; filling is facilitated by two drain plugs 37 and 38 installed in the truncated cylinders 5 and 6 respectively, in order to seal off and release vents opening into the chamber 34 and 35, respectively.

The high-viscosity fluid used is a silicone-based fluid, such as the one marketed by the Rhone-Poulenc company under the name Rhodorsil 47 V 12500, whose viscosity varies as a function of the temperature to a much less marked extent than mineral or organic fluids having a lower viscosity which are normally used as hydraulic fluid in aviation-quality dampers. In addition to its compatibility with the natural rubber used to make the elastomer-based sleeves 17 and 18, each of which seals off in water-tight fashion one of the damper chambers 34 and 35, the advantage of a silicone-based fluid of this type, whose viscosity at a temperature of 25° C. is on the order of 12,500 centistokes, is that, for a difference of 100° C., its viscosity varies according to a ratio of 8 instead of 40 for a normal hydraulic fluid, thereby conferring damping properties that are much more stable as a function of temperature. The use of this silicone-based high-viscosity fluid also makes it possible to use, as a narrow fluid-throttling passage providing for the permanent connection between the two damper chambers 34 and 35, whose internal volumes vary in opposition when the internal armature 28 and external armature 4 are displaced axially in relation to each other by means of an axial load producing a force of compression or traction on the strut, the annular passage marked off by the relatively sizeable radial play, e.g., of about 1 mm, between the internal radial edge of the annular partition 10 and the external lateral surface of the brace 23. The magnitude of this radial play 39, which marks off the axial annular throttling passage, shown on a larger scale at 39 in FIG. 3, makes it possible to increase manufacturing tolerances, in particular as regards the central hole of the partition 10 and the external diameter of the brace 23, without producing an observably unfavorable effect on damping properties.

Damping is produced by the throttling of the fluid through the annular passage 39, between the partition 10 and the brace 23 which constitutes the central portion of the internal armature 28. The fluid flows out of that one of chambers 34 and 35 which is compressed by the relative axial displacement of the armatures 4 and 28 and toward the other chamber, in which the pressure is reduced in relation to the first, while the elastic return of the two armatures 4 and 28 toward their relative initial position is produced by the two springs 2 and 3, accompanied by a rigidity which is determined by the seals made of an elastomer 17 and 18, and to which is added the rigidity resulting from the compressibility of the silicone-based fluid, while the elastomer-based sleeves 17 and 18 are deformed by shearing not only as a result of the relative displacement of the armatures 4 and 28, but also because of the internal hydraulic pressure in the damper 1.

Since the throttling passage 39 is defined by the abovementioned radial play and by a length which corresponds to the axial dimension of the partition 10, the radial and axial dimensions of this passage 39 may be chosen so as to ensure strong damping, in the form of a sizeable axial stress on the strut, which is required to resist the phenomenon of ground resonance before taking off and after landing at low amplitudes of relative axial displacement of the armatures 4 and 28, e.g., up to 1.5 mm. However, above this first amplitude threshold, it becomes necessary to limit the damping stress in order to limit, during flight at cruising speed, the dynamic stresses in the strut and in its couplings to the blade and the strut.

The damper 1 is, consequently, equipped with a device for limiting the damping stress, which comprises discharge valves having movable seals which free a complementary throttling section added to the section of the annular throttling passage 39, which is permanently opened in order to connect the two damper chambers 34 and 35 when the differential pressure between these two chamber reaches a first pressure threshold which corresponds to a stress making it possible to obtain the threshold amplitude for the relative axial displacement of the two armatures 4 and 28, above which the reduction of the stress transmitted by the strut from one of the ball-joint-equipped connection-pieces 25 or 29 to the other is desired.

These discharge valves are arranged on both sides of the partition, and their movable plugs comprise the prestressed spring-leaves, of which one free end-piece forms a diaphragm which seals off the orifices connecting the chambers 34 and 35, which are made in the form of holes drilled in the partition 10, for as long as the differential pressure between the chambers 34 and 35 is lower than the initial pressure threshold given, these spring-leaves, by their elastic flexion, free these holes, thereby allowing leakage from the chamber 34 or 35, which is compressed, to the other chamber, which is depressed, as soon as the difference in pressure between these two chambers rises above this pressure threshold. The limiting level is adjusted and adapted to the section of the passage in the limiting orifices, and, therefore, to the diameter of the holes, if they are circular, and to the number of these holes, as well as to the prestressing of the spring-leaves. Reduction in the stress transmitted by the damper is thus obtained beginning with a certain pressure differential, and, therefore, with a certain degree of stress whichis exerted on the spring-leaves, by means of the flexion of these spring-leaves which creates for the silicone-based fluid a passage which is complementary to the annular passage 39, and the opening of this complementary passage becomes larger as the magnitude of the stress to be dampened increases.

The discharge valves arranged on both sides of the partition 10 may be sensitive to a single pressure-differential threshold inducing the flexion of their spring-leaves, but it is equally possible that the discharge valves mounted on one side only of the partition 10, which allow leakage in one axial direction only, be made sensitive to a first pressure-differential threshold, while the discharge valves mounted on the other side of the partition 10 be made sensitive to a second pressure differential threshold, and allow the passage of leakage only in the other axial direction, so that the strut benefits from the varying effect of the limiting of the damping stress, depending on whether the strut is subject to a stress of traction or compression.

In the embodiment of the strut shown in FIG. 1, and as shown also in FIGS. 2 through 5, all of the discharge valves are made sensitive to the same single pressure-differential threshold, and the spring-leaves in the discharge valves arranged on a single side of the partition 10 are made in the form of a sealing sub-assembly having a simple, advantageous structure for the purpose of mounting, which, in addition, is identical to the sealing sub-assembly of the valves mounted on the opposite side of the partition 10, to which these two sub-assemblies are attached using common means.

Figure 2:
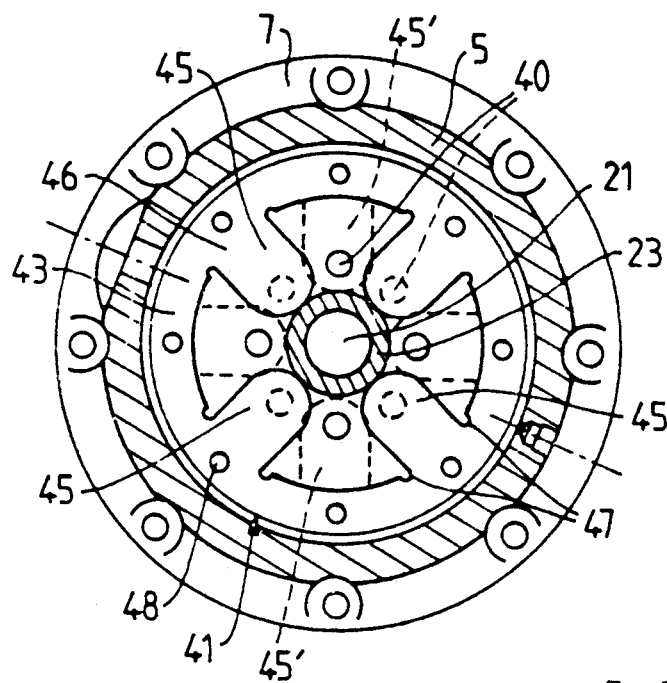
FIG. 2 is a schematic, transverse sectional view along line II—II of FIG. 1.

As shown in FIG. 2, the partition 10 has eight holes 40 drilled in it; these holes, which are circular, axial, and of the same diameter, are evenly spaced circumferentially around the axis A—A and at a relative short distance from the annular throttling passage 39. Two of these holes 40 are also shown in FIG. 1, and a single hole in FIGS. 3 and 5. Four of these holes 40, taken circumferentially in alternating fashion, and thus offset from each other at an angle at center of 90°, are covered by a sealing sub-assembly 41, which is housed in the damper chamber 24 and set so as to rest against the surface of the partition 10 facing this chamber 34, while the other four holes 40, also offset at 90° from each other, are covered by a sealing sub-assembly 42 which is identical to the sub-assembly 41, but which is housed in the damper chamber 35 and set so as to rest against the other surface of the partition 10 which faces this chamber 35; in addition, the sub-assembly 42 is offset circumferentially by an angle at center of 45° in relation to the sub-assembly 41, which is shown in continuous lines in FIG. 4.

This sealing sub-assembly 41 is cut from a single piece of sheet metal and comprises a peripheral, essentially flat annular collar 43. The collar 43 supports four spring-leaves 45 which are identical and circumferentially offset at 90°. Each extends radially inward and is attached to the collar 43 by a base 46 set off between two small rounded recesses 47 cut in the internal radial edge of the collar 43, for the purpose of facilitating the flexion of the spring-leaf 45 in relation to the collar 43. In the internal radial position, the free, rounded end of each spring-leaf 45 forms a diaphragm which is positioned opposite to one of the four holes 40 which match up with the sub-assembly 41, and the spring-leaves 45 are prestressed in such a way that they rest against the corresponding surface of the partition 10, and that their end diaphragms close off the corresponding four holes 40, as shown in FIG. 2.

Figure 3:
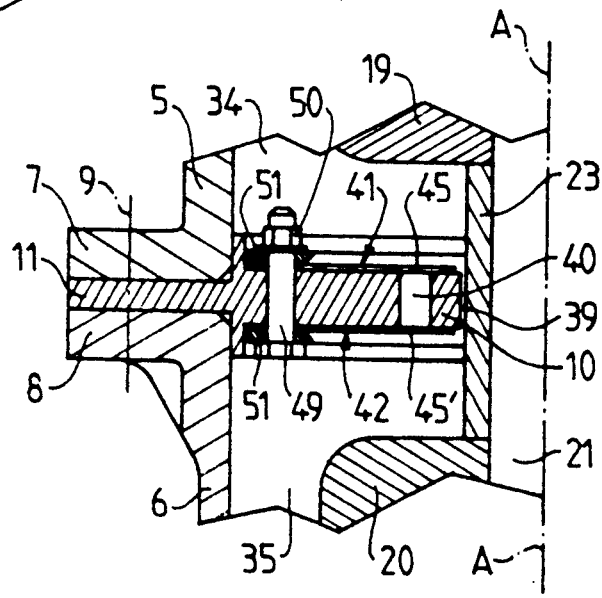
FIG. 3 is a partial view on a larger scale of a detail of the axial and longitudinal sectional view in FIG. 1.
Figure 5:
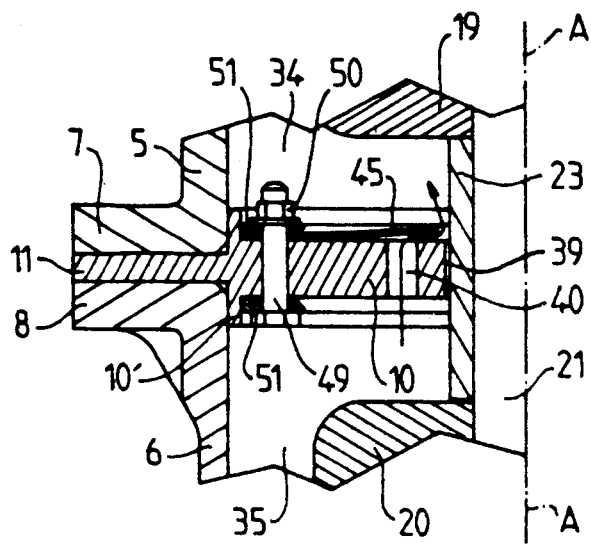
FIG. 5 is a partial view analogous to FIG. 3, representing the functioning of a discharge valve equipped with spring-leaves.

The sealing sub-assembly 42, which is identical to the subassembly 41, is positioned so as to rest against the other surface of the partition 10, but in the above-mentioned angular offset position of 45° in relation to the sub-assembly 41, in such a way that the spring-leaves 45' in the sealing sub-assembly 42 are prestressed and set against the surface of the partition 10 facing the chamber 35, and close off, by means of their end diaphragm, the four other holes 40. Thus, the holes 40 are covered in a staggered pattern, four on one side of the partition 10 and four others on the other side of this partition, by the prestressed spring-leaves 45 and 45', as shown in FIG. 2. In this FIG. 2, the spring-leaves 45' have been partially shown using dotted lines. The collars 43 in the two sub-assemblies 41 and 42 each have eight fastening holes 48 drilled through them, circumferentially offset at 45° from each other, and positioned so as to coincide not only with each other and from one subassembly 41 or 42 to the other because of the circumferential gap of 45° between these two sub-assemblies 41 and 42, but also with eight attachment holes drilled in the external radial portion of the partition 10. Furthermore, each hole is centered along the same radial direction as one of the eight limiting holes 40, respectively, as is shown also in FIG. 2. The two sealing subassemblies 41 and 42 may thus be attached to the opposing surfaces of the partition 10 by means of eight identical assemblies made up of a screw 49 and a nut 50, of which one only is shown in FIGS. 3 and 5, and of which two may be seen in FIG. 1. To ensure that the collars 43 rest properly against the opposite surfaces of the partition 10, a washer 51 is also interposed between the heads of screws 49 and the collar 43 of the sealing sub-assembly 42, and a second washer 51 is also inserted between the nuts (screwed onto the screws 49) and the collar 43 of the other sealing sub-assembly 41; the two washers 51 are both ring-shaped and have an internal radial edge which is bevelled on the side turned toward the partition 10, as shown in FIGS. 3 and 5, in order not to deform the spring-leaves 45 and 45' or to interfere with them when they are elastically flexed toward the interior of the chamber 34 or 35 which houses them.

Thus, as shown schematically in FIG. 5 with reference to a single spring-leaf 45, when the silicone-based fluid contained in the damper chamber 35 is compressed by a relative axial displacement of the armatures 4 and 28 of the strut, and when the dynamic pressure in the chamber 35 becomes greater than the pressure in the chamber undergoing depressurization 34, with a pressure difference which is greater than the pressure threshold determined by the section of the corresponding hole 40 and by the prestressing of the springleaf 45, this spring-leaf 45 is subjected to a stress greater than its prestressed value, and, thus becoming elastically flexed toward the interior of the chamber 34, is drawn away from the hole 40 which it sealed previously, thereby freeing a connecting passage between the two chambers 34 and 35 which allows leakage (indicated by an arrow in FIG. 5) throttled fluid to flow through this hole 40 and to be added to the fluid throttled through the annular passage 39. The same sequence occurs involving the three other spring-leaves 45; on the other hand, the springleaves 45' are tightly positioned against the partition 10 so as to seal the four holes 40 opposite to which their end diaphragms are positioned, thus preventing any leakage from the compressed chamber 34 toward the chamber in which the pressure has been decreased.

Inversely, when the chamber 34 is compressed and the pressure in the chamber 35 decreased, and when the differential pressure between these chambers exceeds the pressure threshold mentioned above, the four spring-leaves 45' bend toward the interior of the chamber 35 undergoing depressurization, thus freeing the four corresponding holes 40 and allowing leakage from the compressed chamber 34 to the depressurized chamber 35, while the four spring-leaves 45 are set in position so as to seal off the four corresponding holes 40, thus preventing any flow from the chamber 34 to the chamber 35.

The strut also comprises an integrated device which compensates for variations in the volume of silicone-based fluid as a function of temperature; these variations are generally called "thermal expansion" of the fluid. This device for compensation of thermal expansion of the fluid is constructed in the form of a pneumatic accumulator 52 housed inside of the internal cylindrical section 15 of the return spring 2 and described below in reference to FIGS. 1 and 6. This pneumatic accumulator 52 contains a pneumatic chamber 53 which is marked off between, first, a sealing cover 54 capping the external axial end of the cylindrical section 15, on which the cover 54 is held by a retainer ring 55, and, second, an elastomer-based flexible, water-tight diaphragm 56 having a cup-like shape and a rounded base, which is inserted into the cylindrical section 15 in such a way that its rounded base covers the nut 24 and the threaded end of the shaft 21. The peripheral edge of the diaphragm 56 is equipped with a flexible flange 57 which is snapped into position in a peripheral groove in the part of the cover 54 which is inserted into the cylindrical section 15, in such a way that the diaphragm 56 is thus set, in a water-tight fashion, both into the groove of the cover 54 so as to seal the pneumatic chamber 53, making it water-tight, and against the internal surface of the cylindrical section 15 so as to seal in a water-tight fashion a hydraulic compensation chamber 58 delimited between the diaphragm 56 and the bottom 19 and internal surface of the cylindrical section 15. An orifice 59 drilled into the base 19 (see FIG. 1) provides for a permanent connection between chambers 34 and 58 and allows the filling of the chamber 58 with silicone-based fluid when the damper is filled. The pneumatic chamber 53 contains pressurized air which is introduced through the inflation valve 60 mounted on the cover 54 under a rated inflation pressure set, for example, at 0.6 MPa at a nominal temperature of 20° C. The valve 60 is accessible from the outside of the strut by one of two recesses 61 in the bell-shaped connection-piece 29; the other recess 61 permits external visual inspection of the fluid filling level of the compensation chamber 58 by using the level indicator installed on the accumulator 52. This level indicator comprises an indicator stick 62, one end of which, having the shape of an enlarged head, is elastically snapped into position in a recess in the central portion of the rounded bottom of the diaphragm 56, and this indicator stick 62 passes axially through the pneumatic chamber 53 in such a way that its opposite end-piece is mounted so as to slide in a transparent tube 63, which passes axially through the cover 54 in water-tight fashion, and is held in place in this cover by a collar enclosing the central opening of the cover into which the stick 62 is inserted, while its end-piece, projecting outward from the cover, is closed. The fluid volume in the compensation chamber 58 is pressurized by the diaphragm 56, which is acted upon by the gas-powered spring constituted by the pneumatic chamber 53, so as to cause the pressure in this pneumatic chamber to be transmitted through the orifice 59 to the two damper chambers 34 and 35, thereby determining the static pressure of the damper at which the compensation chamber 58 is filled with fluid to mid-level.

When heating causes the silicone-based fluid to expand, the excess fluid collected in the chamber 34 and 35 flows through the orifice 59 into the compensation chamber 58 and pushes the diaphragm 56 back by compressing the air contained in the pneumatic chamber 53, so that the increase in volume may be absorbed. Inversely, when cooling takes place, the contraction of the silicone-based fluid in the chamber 34 and 35 solicits a flow of fluid from the compensation chamber to the chambers 34 and 35 through the orifice 59 as a result of the action produced by the diaphragm 56, which is pushed back by the pressure reduction of the air in the pneumatic chamber 53 in a direction which reduces the volume in the compensation chamber 58.

The orifice 59 connecting the compensation chamber 58 and the damper chambers 34 and 35 is calibrated and of small diameter in order to act as a dynamic filter which insulates the compensation chamber 58 from dynamic pressure pulsations in the damper chambers. This effect is obtained because the small diameter of the orifice 59 introduces into the high-viscosityfluid passage a loss of load sufficient to filter out variations in dynamic pressure within the desired operating range of the damper.

Figure 6:
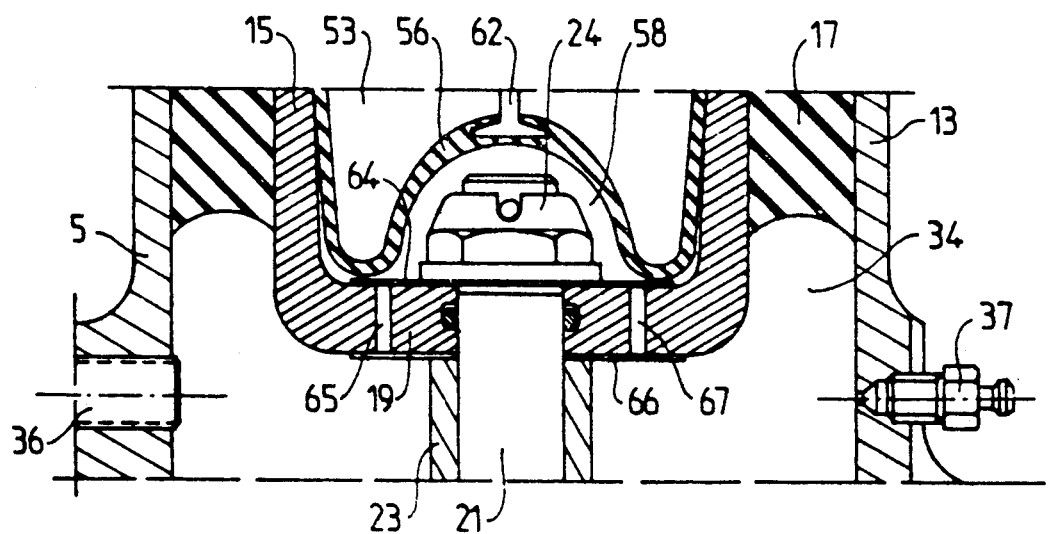
FIG. 6 is a partial, larger-scale view of a portion of the section shown in FIG. 1 corresponding to the accumulator which compensates for thermal expansion of the hydraulic fluid.

This insulation of the pneumatic accumulator 52 from dynamic pressure pulsations in the damper chambers 34 and 35 is also provided by a dual valve equipped with spring-leaves which form diaphragms and act in the same way as the limiting valves described above. This dual valve is shown in FIG. 6. It comprises an excess-pressure valve composed of a spring-leaf 64 of which a part is kept pressed against the surface of the base 19 which faces toward the chamber 58, by means of a nut 24 which is screwed onto the shaft 21, and of which another free-standing part forms a diaphragm prestressed against this bottom 19 surface so as to seal off a second orifice 65 drilled in the bottom 19 which connects the chambers 58 and 34. The spring-leaf 64 is calibrated at an opening pressure which is greater than the normal maximum operating pressure of the damper, so that, in the event of an accidental overload in the damper chambers 34 and 35, the fluid may elastically push the spring-leaf 64 toward the inside of the chamber 58 and flow into this chamber 58, where its pressure is reduced by pushing against the diaphragm 56. The other valve is a supercharging valve comprising a spring-leaf 66, of which one portion is held pressed against the bottom 19 surface turned in the direction of the chamber 34, by means of the tubular brace 23, and of which another free part forms a diaphragm prestressed against this base 19 surface so as to seal a third orifice 67 drilled in the base 19 and connecting the chambers 34 and 58. This spring-leaf is calibrated at a pressure lower than the inflation pressure of the pneumatic accumulator 52 in order to provide for the correct filling of the damper chambers 34 and 35 so as to avoid any cavitation, in particular after an operational phase during which the pressure in the chamber 34 has been reduced.

In comparison with dampers using low-viscosity hydraulic fluid, and in addition to the advantages previously mentioned, the strut according to the invention has additional advantages including, most notably, the total water-tightness of the damper and integrated compensation for the thermal expansion of the fluid. Furthermore, the structure of the strut contains no components that may become worn out, thus providing a guarantee of reliability and durability. The manufacturing costs of the strut are reduced, because the use of high-viscosity fluid makes it possible, first, to increase manufacturing tolerances, and, second, to use valves that are simply constructed, and thus economical.

In addition to these advantages, the damper mounted on the strut according to the invention may make it possible to provide variable damping as a function of the load placed on the strut, and especially of the static load, by causing variation in the magnitude of the radial throttling play between the partition 10 and the brace 23 as a function of the relative axial position in which these two components are placed.

Figure 7:
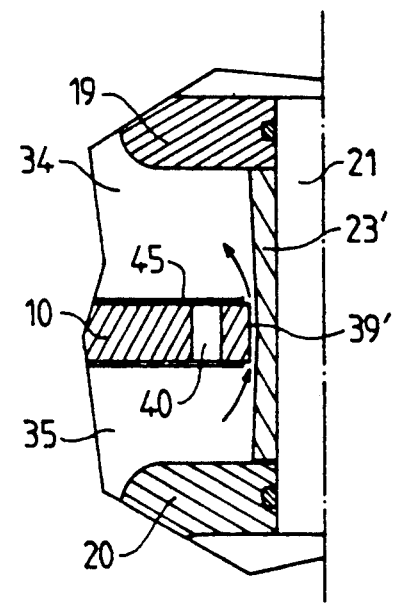
FIG. 7 is another partial, larger-scale view of a detail of a variant of FIG. 1, which provides variable damping as a function of the damper load.

FIG. 7 is a partial representation of a variation of the strut shown in FIGS. 1 through 6, in which the damper provides variable damping of this kind as a function of the static load of the strut. In this variant, the lateral external surface of the tubular brace 23' is not cylindrical, but has a biconical shape whose central portion diverges toward its end-pieces which are pressed against the bases 19 and 20 of the internal cylindrical sections of the return springs. Thus the radial play 39', delimited by the internal radial edge of the annular partition 10 and by the external lateral surface of the brace 23', is reduced when the brace 23' is displaced axially together with the internal armature assembly in one direction or the other in relation to the partition 10 and to the external tubular armature. It thus becomes possible to make a strut producing a damping effect which hardens as a function of its operation.

A strut according to FIGS. 1 through 7 may thus have characteristics which are adapted to the equipment of the rotor supporting a low-tonnage helicopter. However, the deformation of the elastomer-based sleeves 17 and 18, which provide for the water-tight sealing of the chambers 34 and 35 of the damper under the effect of the internal dynamic pressure of this damper, may lead to a deterioration of the damping characteristics incompatible with the load requirements that are transmitted to a damper designed to equip a rotor supporting a medium-tonnage helicopter. Furthermore, it may be desirable, on the rotor of such a helicopter, to increase the damping effect at large amplitudes of the relative axial displacement of the armatures of the strut.

Figure 8:
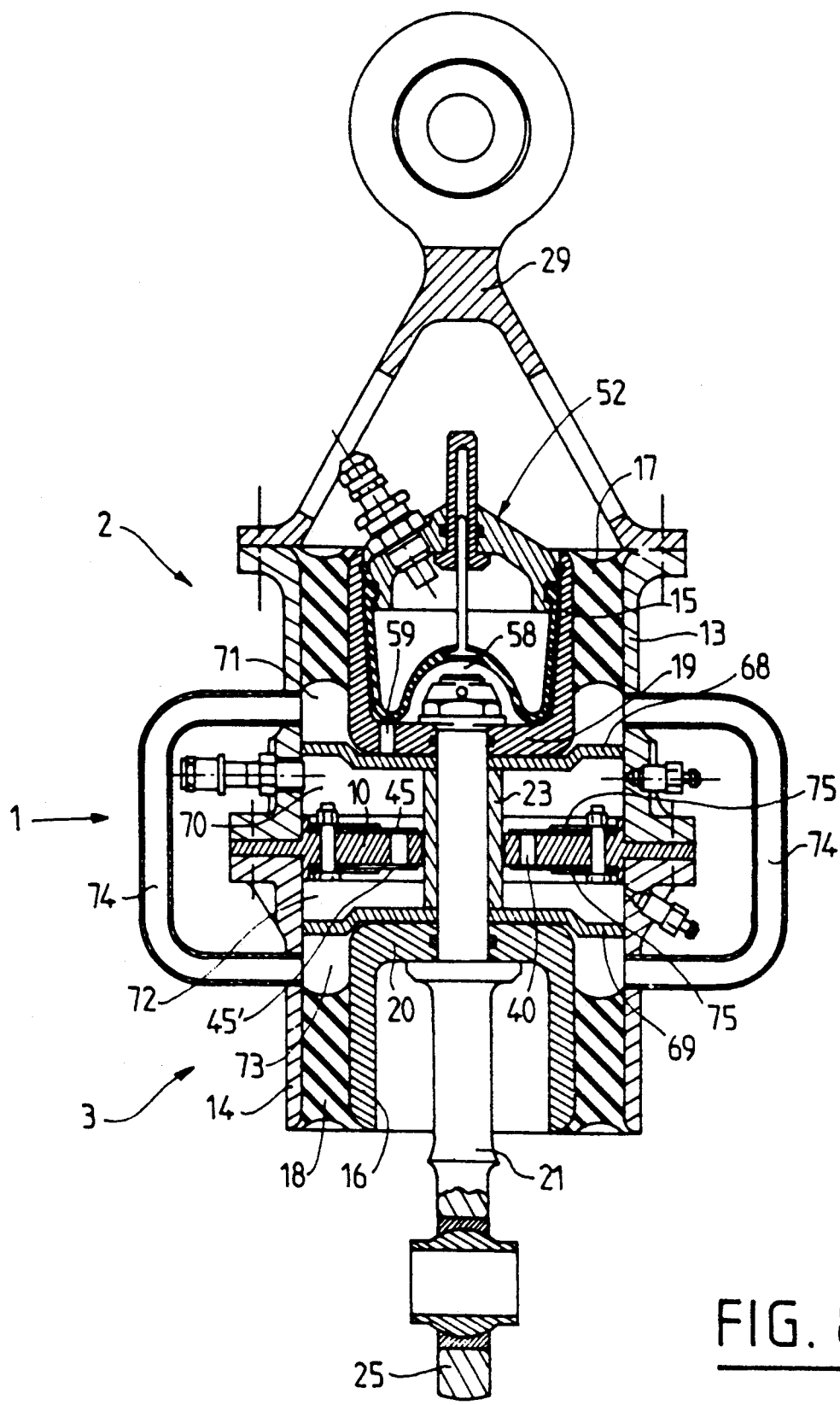
FIG. 8 is an axial and longitudinal sectional view, analogous to that of FIG. 1, of a second embodiment according to the invention.

The second strut embodiment, shown in FIG. 8, was made, first, to remedy the disadvantage in the first example, i.e., the deterioration of the damping characteristics, and, second, to meet the new requirement calling for increased damping of the large relative displacement of the armatures. This second example of struts is the result of two major additions to the basic structure of the first embodiment; this first structure has been retained, thus removing the necessity of describing this basic structure again, the principal components of which are identified in FIG. 8 by using the same numerical references. The description will be limited to the two structural modifications which characterize the second example.

The first principal modification consists in the subdivision of each of the two damper chambers set off between the partition 10 and one of the two return springs 2 and 3, respectively, into two parts separated from one another, and of which one is directly adjacent to the partition 10, while the other is directly adjacent to the elastomer-based sleeve 17 or 18 of the corresponding sleeve 2 or 3; it consists further in connecting together the two parts of the chambers adjacent to the elastomer-based sleeves 17 and 18, so as to compensate for variations in the fluid capacity in the damper chambers resulting from deformations of the elastomer-based sleeves 17 and 18, and thus in not causing the elastomer to function under pressure.

In the second embodiment as shown in FIG. 8, this arrangement is obtained by using rigid, identical dishes 68 and 69, each of which has the shape of a circular plate-shaped disk having a passage drilled in its center for the shaft 21, and of which one (68) is held pressed against the base 19 of the internal cylindrical section 15 by one end of the tubular brace 23, without, however, sealing the orifice connecting with the compensation chamber 58. The dish subdivides the damper chamber 34 present in the first embodiment (see FIG. 1) into a working chamber 70 which is functional under dynamic pressure between the dish 68 and the partition 10, and a compensation chamber 71 for variations in volume resulting from deformations of the elastomer, located between the dish 68 and the elastomer-based sleeve 17.

Similarly, the other dish 69 is held pressed against the base 20 of the other internal cylindrical section 16 by the other axial end of the brace 23, and subdivides the damper chamber 35 present in the first embodiment (see FIG. 1) into a working chamber 72 functioning under dynamic pressure, located between the dish 69 and the partition 10, and a compensation chamber 73 for variations in volume resulting from deformations of the elastomer, located between the dish 69 and the elastomer-based sleeve 18. Furthermore, the chambers 71 and 73 are permanently connected with each other by means of four ducts, each of which is demarcated by one of four bent pipes 74, only two of which are shown in FIG. 8, which are external to the external tubular armature of the strut, and of which the two ends are each connected in a water-tight manner to the tubular damper body into which they open out, in such a way that the silicone-based fluid can flow freely from one to the other of the two chambers 71 and 73 in order to compensate for any variation in volume in these chambers caused by a deformation of the elastomer of the sleeves 17 and 18.

The second major modification, adopted to saturate the leakage flowing from the discharge valves and, therefore, to restrict the limiting of the damping stress so as to increase this stress at large amplitudes, consists in the limitation of the range of motion resulting from the flexion of the spring-leaves. This effect is obtained by installing, in each of the working chambers 70 and 72 of the damper, a stop which restricts the elastic flexion toward the interior of this chamber of each of the spring-leaves 45 or 45' mounted in the corresponding chamber 70 or 72, when these spring-leaves are drawn away from their respective positions in which they seal the limiting holes 40. These spring-leaves 45 and 45' are the movable, diaphragmequipped seals in the discharge valves in a device for limiting the damping stress, which is identical to the one which equips the embodiment of the strut described above in reference to FIGS. 1 through 6, the only difference being that the ring washers 51, inserted in the first embodiment between the collars 43 of the seal sub-assemblies 41 and 42 and the heads of screws 49 and the nuts 50 attaching these sub-assemblies 41 and 42 to the wall 10, respectively, are each replaced by an annular wedge 75, shown in FIG. 4 using broken lines, whose internal radial edge is positioned inward on the other side of the internal radial edge of the collar 43 and of the bases 46 of the corresponding spring-leaves 45 or 45'. Each of these two wedges 75 constitutes a single stop restricting the ranges of motion of all of the flexed spring-leaves 45 or 45' fastened on the corresponding surface of the partition 10.

Figure 4:
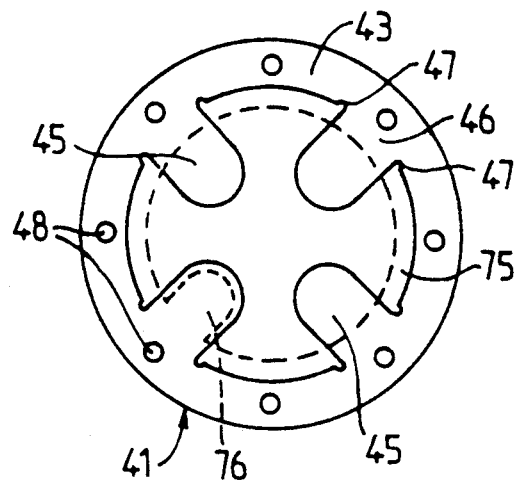
FIG. 4 is a plan view showing, in solid lines, a sealing assembly having four spring-leaves constituting movable seals for four discharge valves making up a limiting mechanism installed on one side of the partition of the strut shown in FIGS. 1-3.

As a variant and as shown also using broken lines for a single spring-leaf in FIG. 4, each wedge 75 has rigid, radial arms 76 whose number equals the number of spring-leaves 45, and which extends radially inward from the internal radial edge of the annular wedge 75. Each arm 76 is opposite to a spring-leaf 45, and extends toward this spring-leaf a curved supporting surface matching the elastic line of the flexed spring-leaf 45 when the differential pressure which bends it equals another pressure threshold, from which the leakage flowing through the corresponding limiting hole 40 must be saturated in order to increase the damping effect.

To summarize, in this second embodiment and as compared with the first, the dishes 68 and 69 and the ducts 74 make it possible to suppress the deformations of the elastomer in the sleeves 17 and 18 produced by the action of the internal dynamic pressure of the damper, and, after the limiting holes 40 are opened, which produces the desired modification of the force curve at the upper limit of a range of low amplitudes of the relative axial displacement of the armatures of the strut, the saturation effect of the leakage flow produced by the movement of the spring-leaves coming to rest against the stop which restricts their elastic flexion provides for the upswing, which is also desired, of the force curve for larger amplitudes of relative axial displacement of said strut armatures.

In order to ensure that the stress level to which the strut is subjected does not excessively shorten the functional life of the mechanical structural components, advantage is gained by reducing this stress level by arranging the strut in such a way that the slope of the damping force curve as a function of the relative axial displacement of its armatures rises more slowly at intermediate displacement amplitudes corresponding to flight at stabilized cruising speed, than the slope both at low amplitudes, intended to provide resistance to ground-resonance, and at large displacement amplitudes, intended to provide resistance to cases of heavy loads producing drag on the blades.

This reduction on the load levels at intermediate displacement levels may be obtained by combining discharge valves chosen after due consideration and incorporating limiting orifices having a large passage section and spring-leaves whose range of motion is restricted by stops, with an integrated limiting-disconnection device having closing valves for sealing the limiting orifices, thereby re-establishing, at large displacement amplitudes, the throttling obtained at low amplitudes.

Figure 9:
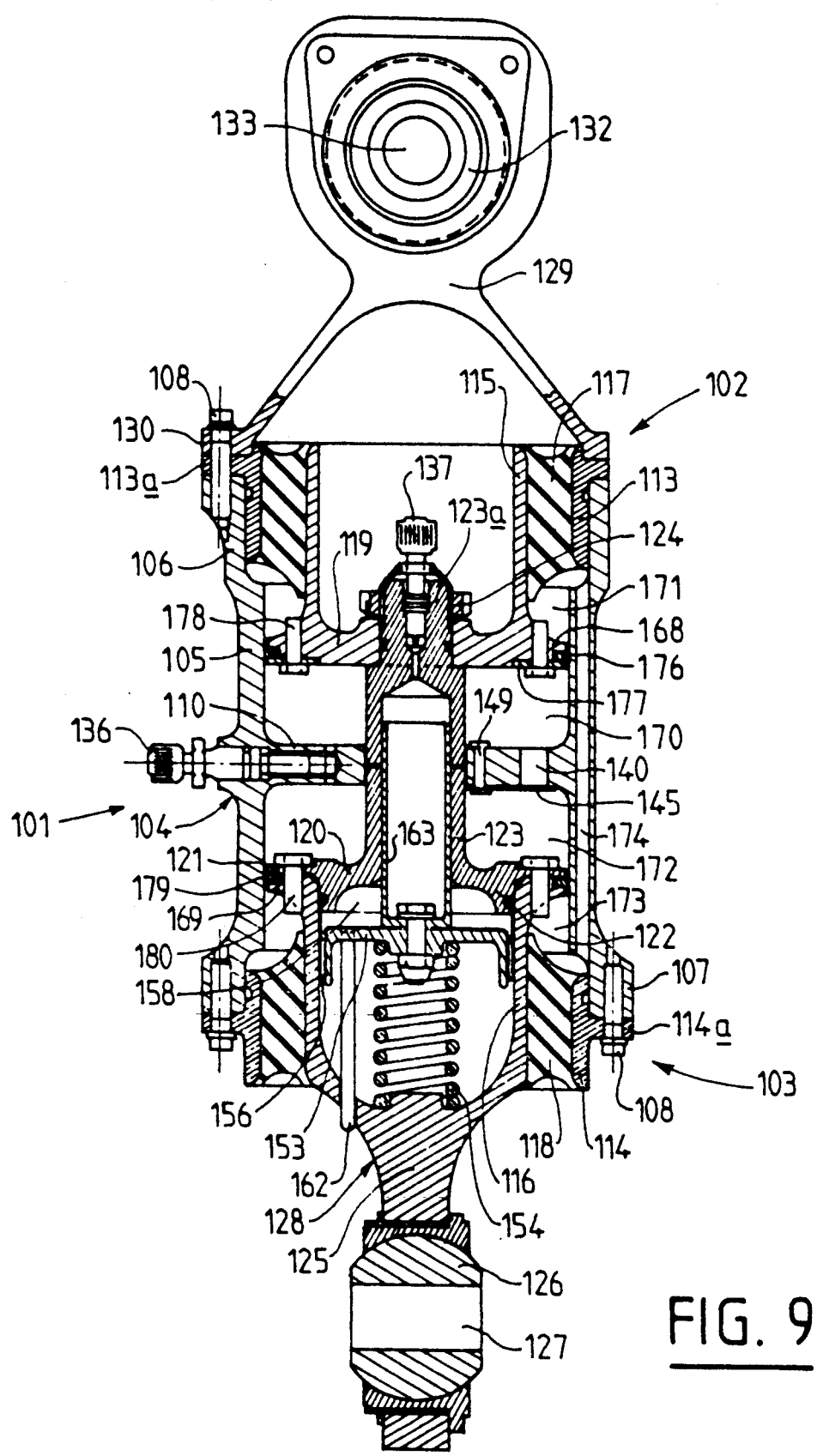
FIG. 9 is an axial and longitudinal sectional view, analogous to that of FIG. 1, of a third embodiment of the strut according to the invention.
Figure 10:
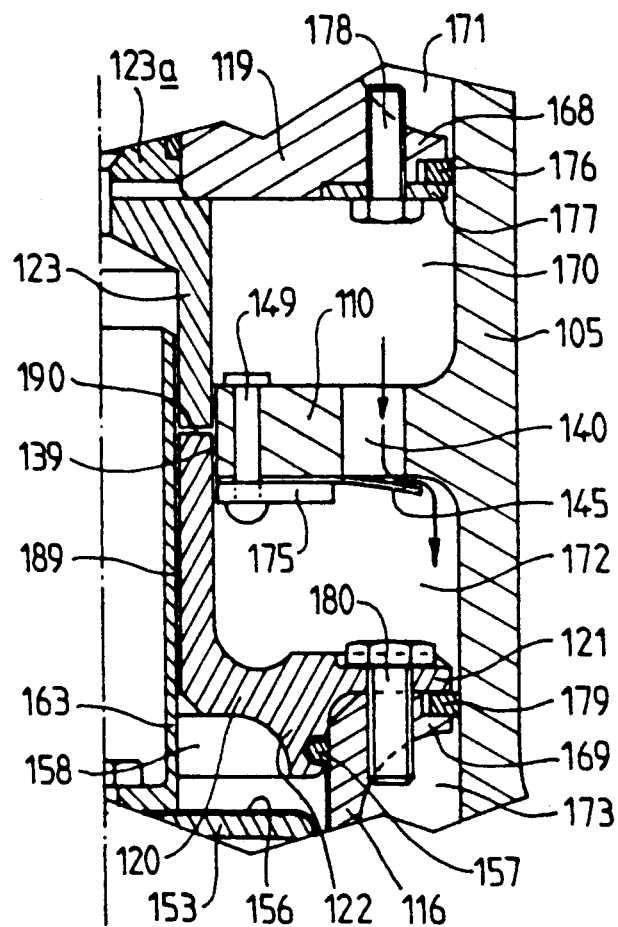
FIG. 10 is a partial, axial sectional view of FIG. 9, showing on a larger scale a portion of FIG. 9 corresponding to the hydraulic damper of the strut.
Figure 11:
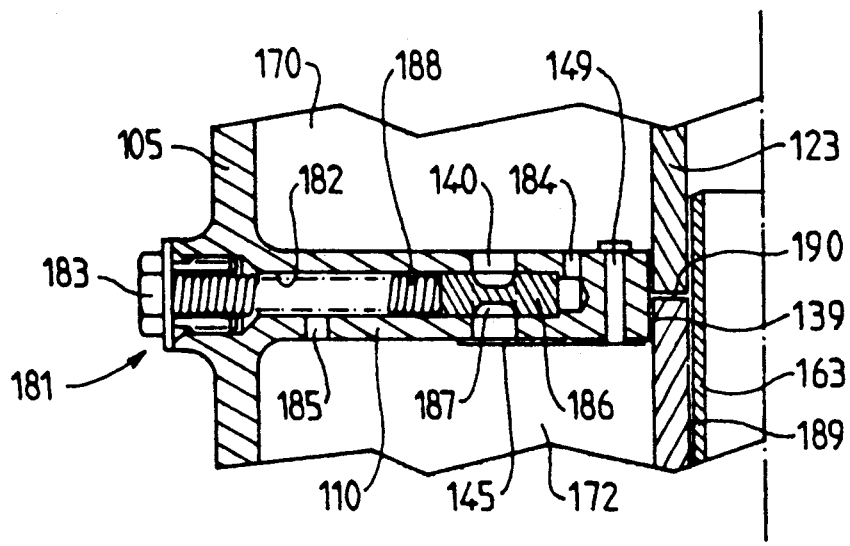
FIG. 11 also shows a partial section, on a larger scale, of a detail of the strut shown in FIG. 9 at its transverse partition.

The third embodiment of the strut, shown in FIGS. 9 through 11, performs not only all of the functions performed by the strut shown in FIG. 8, but also the disconnection of the limiting function and the re-establishment, at large amplitudes, of the throttling produced for low amplitudes, using a device driven by the pressure from the functional chamber under dynamic pressure.

On the hydraulic-elastic strut shown in FIG. 9, there is a linear hydraulic damper 101 with throttling of a high-viscosity fluid and which is incorporated in the central axial position between two return springs 102 and 103 mounted in series and providing resilient return. The assembly is arranged in a rigid external tubular armature 104, which comprises a cylindrical tubular damper body 105 whose two axial end-pieces 106 and 107 are widened, and the two external, rigid tubular cylindrical sections 113 and 114 of the return springs 113 and 114, respectively. Each of the external sections 113 and 114 is inserted coaxially and held in position in a water-tight fashion in one of the widened end-pieces 106 and 107 of the body 105 by fastening screws 108, which are screwed longitudinally in these end-pieces 106 and 107, by tightening against their respective axial ends external radial flanges 113a and 114a on the external sections 113 and 114. The flange 113a is, furthermore, held between the end-piece 106 and an external radial flange 130 on the large open base of the bell-shaped connection-piece 129, which carries a coupling ball-joint 132 equipped with an eye 133 for connection with the rotor hub, and which is thus secured using screws 108 to the external armature 104 of the strut. There is also an annular, transverse partition 110 projecting radially toward the interior of the damper body 105 and forming a damper piston, which, in this case, is unitary with the central part of this body 105. The continuous throttling passage of the damper 101 is also the annular passage demarcated by the radial play between the internal radial edge of the annular partition 110 and the external lateral surface of a tubular brace 123 which forms the central part of the internal axial armature 128. This internal armature 128 also comprises the rigid, internal tubular cylindrical sections 115 and 116 of the springs 102 and 103, respectively, each of which is connected to the corresponding external section 113 or 114 by an elastomer-based sleeve 117 or 118 which is elastically deformable by shearing and vulcanized to be water-tight between the two corresponding rigid sections 113 and 115 or 114 and 116. The internal section 115 is connected to the brace 123 by a radial base 119 unitary with the internal axial end of this section 115, while it presents an axial, central passage, as well as a peripheral flange 168 projecting radially outward, constructed so as to form a piston and mounted so as to slide in a water-tight manner within the damper body 105 as a result of the presence of an annular gasket 176 held in position in a peripheral groove in the flange 168 by a ring washer 177 attached using screws 178 against the surface of the flange 168 positioned facing the partition 110. The internal section 115 is rigidly connected to the brace 123 by its base 119, which is engaged in a water-tight fashion by its central passage onto a threaded, reduced-diameter end-piece 123a of the brace 123, and on which a nut 124 is screwed and held in place, thus forming a movable radial stop which holds the base 119 pressed against the shoulder connecting the reduced-diameter end-piece 123a to the tubular part of the brace 123. The other end of the brace 123 is unitary with a radial base 120, which, as shown on a large scale in FIG. 10, has an external radial flange 121 extending to reach the proximity of the internal surface of the damper body 105, and an axial annular piece 122, which serves to fit the base 120 in a water-tight manner on the inside of the internal axial end of the internal cylindrical section 116 of the spring 103. This base 120 is made unitary with this internal section 116 by its flange 121, which is attached by longitudinal screws 180 against an external radial flange 169 unitary with the internal axial end of the section 116, and constructed to form a piston which is mounted so as to slide within the damper body 105 using an annular gasket 179, which is held in place in a peripheral groove on the flange 169 by means of the flange 121 on the base 120. The internal section 116 is, by its external axial end, made unitary with a joining end-piece 125, which carries a coupling ball-joint 126 equipped with a fastening eye 127 connecting to the base of a blade and which gives to the part formed in conjunction with the internal section 116 the general configuration of a bell-shaped connection piece.

Thus, the internal axial armature 128 comprises internal sections 115 and 116, bases 119 and 120, and the brace 123, and it has a ball-joint-equipped connection-piece 125 for the attachment of the strut to the blade, while the other ball-joint-equipped connection-piece 129 provides the attachment of the strut to the rotor hub.

The damper 101 thus constructed between the two springs 102 and 103 has four chambers filled with silicone-based, highviscosity fluid, two of which are working chambers 170 and 172 functional under dynamic pressure and marked off between the partition 110 and the base 119 and between the partition 110 and the base 120, respectively. The two other chambers are compensation chambers 171 and 173 for variations in volume resulting from deformations of the elastomer of the sleeves 117 and 118, one of which (171) is marked off between the piston 168 and the elastomer-based sleeve 117, which seals the chamber 171 in a water-tight manner, and the other chamber 173 is set between the piston 169 and the sleeve 118, which also provides water-tight sealing of this chamber 173, and the two chambers 171 and 173 directly adjacent to the elastomer-based sleeves 117 and 118 are, furthermore, continuously linked to each other by means of at least one longitudinal conduit such as 174, which is drilled into the thickness of the damper body 105.

In this example, the pistons 168 and 169, integrated into the internal cylindrical sections 115 and 116 of the springs 102 and 103, correspond to the dishes 68 and 69, which, in the second embodiment as shown in FIG. 8, subdivide each of the two chambers, demarcated in the damper body on each side of the partition 10, into two chambers, of which one is a working chamber functioning under dynamic pressure, and the other is a compensation chamber compensating for variations in volume resulting from the deformations of the elastomer.

As in the preceding examples, this elastomer performs two functions: it contributes rigidity which is in addition to that resulting from the compressibility of the fluid and from the hydraulic damping, and it provides the water-tight sealing of the damper 101 between the internal cylindrical sections 115, 116 and the external cylindrical sections 113 and 114 of the return springs 102 and 103.

As in the preceding example, the continuous throttling of a silicone-based fluid between the two functional chambers 170 and 172 is provided for by the annular passage, shown on a larger scale at 139 in FIG. 10 and demarcated by the radial play between the partition 110 and the brace 123, to provide the continuous connection between the working chambers 170 and 172. Beginning with a differential pressure threshold between these two chambers, the limiting of the damping stress is provided, according to whether traction or compression is the source of the stress exerted on the strut, by one or the other of two identical discharge valves arranged on both sides of the partition 110, whose movable sealing plugs each comprise a spring-leaf fastened against the corresponding surface of the partition 110 and prestressed in the initial position in which it seals one of the two limiting holes 140 drilled in the partition 110. In this arrangement, each spring-leaf is drawn away by elastic flexion from the corresponding hole 140 so as to free a throttling section, supplementing that of the annular passage 139, which allows leakage to flow between the two chambers 170 and 172. A single discharge valve, shown in FIGS. 9 and 10, comprises the spring-leaf 145 arranged radially and fastened by its internal radial end-piece against the surface of the partition 110 which is oriented toward the working chamber 172 by a screw-nut assembly 149, and whose external radial end-piece forms a diaphragm which is prestressed in the position in which it seals a hole 140; this spring-leaf 145 is drawn back by elastic flexion toward the interior of the chamber 172, when the pressure in the working chamber 170 exceeds that of the chamber 172, of a value corresponding to the differential pressure threshold mentioned above. The spring-leaf in the other valve is fastened in the same manner on the other surface of the partition 110, in such a way that the two limiting holes 140 are covered in opposition to each other.

As shown in FIG. 10, a stop 175 is fastened by the same screw-nut assembly 149 against the surface of the spring-leaf 145, which faces the chamber 172, in such a way that it limits the range of movement of the flexed spring-leaf 145, so as to saturate the incipient leakage and not to exceed the fatigue-resistance limit of the metal spring-leaf 145.

In order to re-establish the initial throttling through the annular passage 139 so as to obtain the steep slope of increase of the desired force at large amplitudes of relative displacement of the two armatures 104 and 128, each of the two discharge valves is combined with a closing valve which seals the corresponding limiting hole 140. The closing valve 181, in combination with the spring-leaf-equipped discharge valve 145 mentioned previously, is shown in FIG. 11 and is housed in a transverse hole 182 drilled in the thickness of the partition 110 so as to perpendicularly intersect the corresponding limiting hole 140. The external radial end of the hole 182 opens out on the outside of the damper body 105 and is sealed by a removable threaded plug 183, while the internal radial end of the hole 182, beyond the hole 140, is connected continuously to the working chamber 170 by means of a small longitudinal ducts 184 drilled in the partition 110. Another small duct 185 is drilled in the partition 110 and places the working chamber 172 in continuous connection with the hole 182, between the hole 140 and the plug 183. A moveable seal 186, shaped like a slide valve and having a central peripheral groove 187, is mounted so as to slide in a water-tight fashion in the hole 182. A helical spring 188, which is also housed in the hole 182 and rests against the plug 183 and against the end of the slide valve 186 which is oriented toward this plug 183, pushes the slide valve 186 back into its initial position in which the groove 187 lies in the limiting hole 140, and allows the passage of leakage when the spring-leaf 145 is flexed. The pressure of the chamber 172 is continuously applied through the duct 185 onto the end of the slide valve 186 in contact with the spring 188, while the pressure in the chamber 170 is still being applied through the duct 184 on the other end of the slide valve 186. Thus, when the pressure differential between the two chambers 170 and 172 deploys on the slide valve 186 a force greater than the return force exerted by the spring 188, the slide valve 186 is displaced in opposition to the force of the spring 188, and is positioned so as to close the limiting hole 140 because of the end portion of its bearing surface on the side opposite to the spring 188. The slide valve 186 is thus pressure-driven, and the rating of the spring 188 is selected as a function of the functional section of the slide valve 186, in such a way that this valve is moved into a limiting-suppresslon position when the differential pressure which exerts pressure on it exceeds a threshold greater than the differential pressure threshold controlling the elastic deflection of the spring-leaf 145 and than the differential pressure threshold at which the depression of the spring-leaf 145 is restricted by the stop 175 shown in FIG. 10. An identical closing valve is also mounted in the partition 110 so as to cooperate with the other discharge valve, which functions in the opposing direction.

In this third embodiment of the strut, the compensation device controlling the thermal expansion of the fluid is housed in the internal cylindrical section 116 of the spring 103 and also comprises an auxiliary, water-tight chamber 158 filled with fluid and demarcated between the base 120 and a flexible, water-tight unwinding diaphragm 156 made of an elastomer, cup-like in shape, whose peripheral edge has a flange 157 (see FIG. 10) which is held in a water-tight configuration in a peripheral groove on the tubular portion 122 of the base 120 and against the internal cylindrical section 116. The fluid contained in this auxiliary chamber 158 is pressurized by means of a simple, reliable mechanism, comprising a piston 153 mounted so as to slide freely in the cylindrical section 116 which is pushed back against the central part of the diaphragm 156 by a helical compression spring 154 resting against the connecting-piece 125. The piston 153 is guided in its axial movements by an axial shaft 163, which is screwed onto the central portion of the piston 153 while wedging the central portion of the diaphragm 156 against this latter part, and which is fitted so as to slide axially into the tubular brace 123. An indicator stick 162, of which one end is unitary with the piston 153, extends longitudinally in the cylinder 116 in such a way that its free end passes through the base of this cylinder 116 formed by the connection to the connecting-piece 125 and appears as a projection to the outside of the strut, in order to indicate the position of the piston 153 and serve as an indicator of the fluid level of the auxiliary chamber 158.

This chamber 158 is permanently connected with the working chambers 170 and 172 by means of the calibrated axial, annular passage 189 which is demarcated in the brace 123 between the brace and the internal shaft 163 (see FIGS. 10 and 11) and by two diametrically-opposed calibrated radial ducts 190 drilled in the tubular brace 123 and opening out in the annular continuous-throttling passage. This connection may also be embodied by means of at least one calibrated radial duct, as shown at 191 in FIG. 12, drilled in the annular transverse partition 110 and which empties into the longitudinal duct 174 drilled in the thickness of the damper body and placing the two chamber 171 and 173 in permanent connection with each other. These ducts 190 and 191, installed at a point of low dynamic pressure, form a low-pass filter for the dynamic pressure pulsations generated in the working chamber 170 and 172. As in the preceding examples, the increases in the fluid volume are absorbed by an increase in the capacity of the chamber 158 achieved by pushing the diaphragm 156 and the piston 153 in opposition to the spring 154, while at the same time this spring provides for the resupply of the damper chambers under static pressure.

The base 120 may, furthermore, be equipped with an excesspressure valve and a supercharging valve (not shown) which are identical to those which are mounted on the base 119 in the first embodiment of the strut in FIG. 1.

The filling of the damper 101 with fluid is accomplished by means of an input valve 136 (FIG. 9) mounted in a transverse hole drilled into the partition 110 and emptying into a longitudinal passage opening into the two working chambers 170 and 172, and is assisted by a drain plug 137 screwed into an axial, threaded hole which passes through the reduced-diameter end-piece 123a of the brace 123 and opening into the internal hole of this brace, which extends straight through the base 120 and opens into the auxiliary chamber 158. This drain plug 139 makes possible the induction of a state of reduced pressure prior to the pressurized filling through the input valve 136.

A strut of this kind makes it possible to obtain a high damping level at low and at large amplitudes of displacement, thus providing satisfactory helicopter performance on the ground and in flight when carrying large loads, and a damping level which can be sufficiently weakened at intermediate amplitudes corresponding to flight at stabilized cruising speed, so that the durability of the strut is not unnecessarily shortened.

Figure 12:
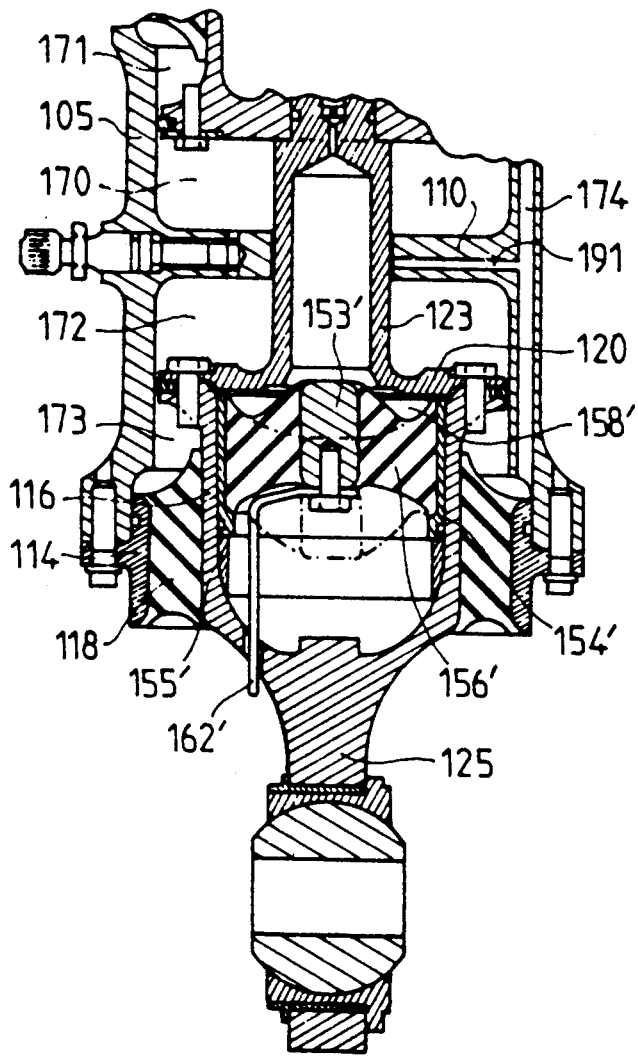
FIG. 12 is a partial axial and longitudinal sectional view of a variant of the strut based on FIGS. 9 and 11.

The variant of the strut in FIGS. 9 through 11, as shown in FIG. 12, has a structure very similar to that shown in FIG. 9, so that the same numerical references have been retained in order to designate identical components, and so that only the basic differences are described below. In addition to the calibrated radial duct 191 throttling in the partition 110 and opening both into the annular rolling passage 139 and into the duct 174, so as to form a connection which filters out the pressure pulsations between the working chamber 170 and 172 and the compensation chambers 171 and 173, the other basic difference relates to the embodiment of the auxiliary chamber, which is water-tight and filled with fluid, of the compensation device for the control of the thermal expansion of the fluid. In the variant in FIG. 12, this auxiliary chamber comprises the capacity contained within the tubular brace 123 and the chamber 158', which is marked off within the internal cylindrical section 116 between the base 120 and an accumulator base which is moveable and elastically deformable and is elastically returned to a position in which the fluid in the auxiliary chamber is compressed and pressurized. This moveable accumulator base comprises an annular wall 156' made of an elastically-deformable elastomer which is made to adhere in water-tight fashion around a rigid central core 153' made of metal or a synthetic material and within a rigid cylindrical casing 154' which is mounted so as to be water-tight and is held in position axially in the internal cylindrical section between the base 120 and a rigid tubular brace 155' so as to be supported against the base of the connection-piece 125. This annular, elastomer-based wall 156' is relatively thick and is molded so as to adopt, in a resting state, the position shown in solid lines in FIG. 12, i.e., a truncated deformation projecting axially toward the base 120, so that the chamber 158' is of minimal size. When the pressurized filling of the strut takes places, the fluid contained in the chamber 158' deforms axially the annular wall 156', which is moved, together with the core 153', toward the connection-piece 125, as shown in dot-dash lines in FIG. 12 and as indicated by the indicator stick 162' which projects outward from this connection-piece 125, and whose internal end is folded and screwed against the surface of the core 153' on the side opposite the chamber 158'. In this way, the wall 156' provides for the water-tight closing of the deformable accumulator base which it forms, while simultaneously constituting the mechanism for pressurization of the oil in the auxiliary chamber by means of the elastic return it undergoes axially so as to compress this oil. This wall 156' thus replaces the diaphragm 156 shown in FIG. 9 for the purpose of providing water-tightness for the accumulator, and replaces both the sliding piston 153 and the spring 154 shown in FIG. 9 in order to furnish pressurization, while the axial guidance shaft 163 in FIG. 9 is removed, since the piston to be guided is also eliminated.

For all other purposes, this variant of the strut functions in the same way as the strut described above in reference to FIGS. 9 through 11, and provides the same advantages.

What is claimed is:

1. Resilient return strut of the elastic-hydraulic type with incorporated linear damping, by throttling a hydraulic fluid, intended in particular for a blade of an aerodyne rotor of a rotary-wing aircraft, and comprising:

(a) first and second rigid elements (25, 29), each provided with articulation means (26, 32) for connecting one of said rigid elements to a first part, as a blade or a part-joining said blade to a rotor hub, and the other of said rigid elements to a second part, such as said rotor hub;

(b) a hydraulic damper (1) comprising two damper chambers (34, 35), of inversely variable capacities, said damper chambers being delimited within a tubular body (12) which is unitary with one of said rigid elements (29) and being separated from one another by a transverse partition (10), constituting a piston, said partition being mounted in said tubular body (12) and being unitary with one of said rigid elements (29), and which are filled with a hydraulic fluid intended to flow from one to the other of the damper chambers (34, 35) through at least one narrow connecting passage (39) between these chambers (34, 35) when the rigid elements (25, 29) are displaced one in relation to the other substantially along the general axis (A—A) of the strut, so as to produce a linear damping effect on the relative displacement of the rigid elements (25, 29);

(c) a device (52) for compensation of thermal expansion of the hydraulic fluid, comprising an auxiliary chamber (58) containing a volume of hydraulic fluid, said auxiliary chamber being permanently connected with at least one of the damper chambers (34) through a damper base (19) which partially delimits the auxiliary chamber (58) and is adjacent to a damper chamber (34);

(d) at least one resilient return device (2 or 3) comprising a sleeve (17 or 18) made of an elastically-deformable material and attached so as to be water-tight by its internal and external lateral surfaces, respectively, between two rigid tubular sections, internal (15 or 16) and external (13 or 14) respectively, each of said tubular sections being substantially coaxial with said general axis (A—A) of the strut and unitary with one of said first and second rigid elements (25, 29), respectively, such that the sleeve (17 or 18) is deformed by shearing when said first and second rigid elements (25, 29) are displaced relative to one another substantially along said general axis (A—A) of the strut, and such that the sleeve (17 or 18) exerts on said rigid elements a resilient return effect tending to return them to an initial relative position, in which arrangement said sleeve (17 or 18) also forms a fluid-tight closure seal sealing the hydraulic damper (1);

(e) wherein the damper chambers (34, 35) are delimited axially between first and second resilient return devices (2, 3) having external rigid tubular sections (13, 14) arranged longitudinally on either side of said tubular damper body (12), said external rigid tubular sections (13, 14) being substantially coaxial one with the other and with said tubular body (12) and being unitary with said tubular body (12) while constituting a single external tubular armature (4) which is unitary with one (29) of said two rigid elements, and in which arrangement the internal rigid tubular sections (15, 16) of the resilient return devices (2, 3) are substantially coaxial one with the other, are arranged longitudinally while leaving clearance on either side of said transverse partition (10) of the damper (1), and are unitary with one another and with the other rigid device (15), with which said external tubular armature (4) does not form a single piece, while forming a single internal armature (28) comprising a central part (23) which passes axially through the two damper chambers (34, 35) and secures the two internal tubular sections to one another, while being enclosed by the transverse partition (10) which is annular in shape and unitary with one of the armatures (4), and in such a way that said sleeves (17, 18) made of an elastically-deformable material each provide the fluid-tight sealing of one of the two damper chambers (34, 35) respectively, on opposite sides of the transverse partition (10), said narrow connecting passage being a narrow annular passage (39) delimited by radial throttling play between said transverse partition (10) and that one (28) of the armatures with which said transverse partition (10) does not form one piece, and through which the highviscosity hydraulic fluid, which is contained in the damper chambers (34, 35) and in the auxiliary chamber (58), is throttled; and (f) wherein each of the two damper chambers (34, 35) delimited on either side of said transverse partition (10) in the tubular damper body (12) is subdivided by a rigid transverse wall (68, 69) unitary with that one of the two armatures with which said transverse partition (10) is not unitary, into two chambers of which one, in an internal axial position and adjacent to said transverse partition (10), is a working chamber (70, 72) operating under dynamic pressure, and of which the other, in an external axial position and directly adjacent to the elastically-deformable sleeve (17, 18) on the corresponding side, is a compensation chamber (71, 73) which controls variations in volume resulting from deformations in the elastically-deformable material, and which is permanently connected with the other chamber of the same kind and in the external axial position by means of at least one conduit (74).

2. Strut according to claim 1, wherein said annular transverse partition (10) is unitary with the external tubular armature (4) and is extended as a substantially radial projection toward the interior of the central part of said external armature (4), thus forming a damper body (12), such that its internal radial edge delimits said annular throttling passage (39) around said central portion (23) of the internal armature (28).

3. Strut according to claim 2, wherein said central portion of the internal armature (28) comprises a longitudinal brace (23) which maintains a uniform axial gap between two damper bases (19, 20), each of said damper bases being adjacent to one of the damper chambers (34, 35) respectively and being unitary with one of the internal tubular sections (15, 16) respectively, said annular throttling passage (39) being delimited between said transverse partition (10) and the external lateral surface of said brace (23).

4. Strut according to claim 1, wherein the hydraulic damper (1) comprises at least one device for limiting the force of damping, said device comprising at least one discharge valve (45, 40) permitting leakage from one of the damper chambers (34, 35), compressed by the relative axial displacement of the two rigid elements (25, 29), to the other damper chamber in which the pressure is reduced, when the differential pressure between the two chambers exceeds a predetermined threshold.

5. Strut according to claim 4, wherein the force-limiting device comprises at least two discharge valves (40, 45, 45'), at least one (40, 45) of said discharge valves permitting leakage from a first damper chamber (34) toward said second chamber (35) when the pressure in said first chamber rises above a first threshold above the pressure in said second chamber, and preventing any flow of the high-viscosity fluid from said second chamber (35) to said first chamber (34), while at least one other discharge valve (40, 45') permits leakage from said second chamber (35) toward said first chamber (34) when the pressure in said second chamber is greater than a second threshold, selectively equal to said first threshold, above the pressure in said first chamber (34), and prevents any flow from said first chamber (34) toward said second chamber (35) of the damper.

6. Strut according to claim 4, wherein at least one discharge valve comprises a prestressed movable seal (45) which is, under normal use, returned to a position in which it seals at least one limiting orifice (40) connecting the two damper chambers (34, 45), and withdrawn from said sealing position as soon as the differential pressure which determines its operation exceeds said corresponding predetermined threshold.

7. Strut according to claim 6, wherein at least one limiting orifice is a hole (40) drilled through the transverse partition (10), and said movable seal is a spring-leaf (45) of which at least one part, constituting a diaphragm, is housed in one of the damper chambers (35), and which is prestressed and pressed, in the position in which it seals the hole (40), against the surface of the partition (10), which faces said damper chamber (35), and wherein said hole (40) becomes progressively unobstructed by means of elastic flexion of the spring-leaf (45) toward the interior of said damper chamber (35) which houses it at least partially, with the result that a passage supplementing the annular throttling passage (39) is freed and that the section for throttling the high-viscosity fluid is increased as soon as the pressure in said damper chamber (35) falls below the pressure in the other damper chamber (34), o+a value equal to said corresponding predetermined threshold.

8. Strut according to claim 7, wherein the spring-leaf (45) of at least one discharge valve is fastened against the surface of the partition (10) which faces the damper chamber (34) toward the interior of which the spring leaf (45) is flexed when said discharge valve is opened.

9. Strut according to claim 8, wherein at least one spring-leaf (45) located on one side of the partition (10) and at least one spring-leaf (45') located on the other side of said partition (10) are attached to said partition by common attachment means (49, 50).

10. Strut according to claim 8, wherein at least one spring-leaf (45) and at least one wedge (75) forming a stop which restricts the flexion of said spring-leaf (45) are attached to the partition (10) by common attachment means (49, 50).

11. Strut according to claim 10, wherein a wedge (75) forming a single stop for all of the spring-leaves (45, 45') arranged on the same side of said partition (10) is an annular washer rigidly set in place against the annular collar (43) with which said spring-leaves (45, 45') are unitary, and comprising radial arms (76) projecting inward and covering said spring-leaves (45, 45'), while having, facing these spring-leaves, supporting surfaces matching the elastic line of the spring-leaves (45, 45') in flexion corresponding to a differential pressure equal to said third threshold.

12. Strut according to claim 8, wherein the force-limiting device comprises several holes (40) drilled int he transverse partition (10), each of said holes being associated to a discharge valve incorporating a prestressed spring-leaf (45, 45'), and wherein said discharge valves are arranged on either side of said partition (10) in such a manner that the spring-leaves (45, 45') in all of the valves which permit leakage in one direction from one damper chamber to the other, are all attached to the surface of the partition (10) which faces the damper chamber in which said spring-leaves (45, 45') are flexed.

13. Strut according to claim 12, wherein the spring-leaves (45, 45') attached to the same surface of the transverse partition (10) extend, in non-flexed position, substantially radially against said surface.

14. Strut according to claim 12 or 13, wherein at least two spring-leaves (45, 45') arranged on a single side of the transverse partition (10) are unitary with a common seat (43), in relation to which the spring-leaves are designed to be flexed elastically, and which is attached to the surface of said partition (10) which faces toward this side.

15. Strut according to claim 12 or 13, wherein all of the spring-leaves (45, 45') arranged on the same side of the transverse partition (10) are made of a single piece, cut from sheet metal, which is unitary with a flat annular collar (43) attached in movable fashion to an annular part set in an external radial position on the corresponding surface of said partition (10) and on the inside of the damper body (12), and wherein each spring-leaf (45) is connected to said collar (43) by its base (46), which is delimited between two recesses (47) cut in the internal radial edge of said collar (43), and extends toward the interior of this collar to its free end which forms a diaphragm facing a limiting hole (40) in said partition (10).

16. Strut according to claim 12, wherein the partition (10) is pierced by an even number of limiting holes (40), evenly spaced circumferentially around the axis if the strut, and wherein one-half of the same even number of springleaves (45, 45') are arranged on each side of the partition (10) in such a way that the spring-leaves on each side of said partition cooperate with one-half of the number of holes (40), taken circumferentially and in an alternating arrangement with the other of the holes (40) cooperating with the spring-leaves on the other side of the partition (10).

17. Strut according to claim 16, wherein the spring-leaves (45, 45') are embodied in two identical sub-assemblies (41, 42), each of which is attached to one of the surfaces, respectively, of the transverse partition (10) using the same screw-nut assemblies, and each of which is made of a single piece of sheetmetal offset circumferentially in relation to the other piece of sheet metal at an angle at center equal to the ratio of 360° to the number of limiting holes (40) drilled in the transverse partition (10).

18. Strut according to claim 6 or 7, wherein the hydraulic damper (1) further comprises at least one device (75) for the saturation of the leakage flow from at least one of said discharge valves (40, 45), said device limiting said leakage flow when the pressure differential between the two damper chambers (34, 35) reaches a third predetermined threshold greater than said first and/or second predetermined threshold.

19. Strut according to claim 18, wherein said saturation device comprises a mechanism containing at least one stop (75) which restricts the motion of the movable seal (45) when said seal is withdrawn from the position in which it seals the corresponding limiting hole(s) (40).

20. Strut according to claim 19, wherein said stop is a wedge (75) fastened to one surface of said partition (10) and overlapping at least partially a springleaf (45), such that said spring-leaf is at least partially housed between said wedge (75) and said partition (10) surface, and such that its ranges of motion when subjected to flexion are restricted by its abutment against said wedge (75).

21. Strut according to claim 18, wherein the hydraulic damper (101) further comprises at least one pressure-driven limiting-suppression device (181) which controls the interruption of the flow of leakage from at least one discharge valves (140, 145) when the pressure differential between the two damper chambers (170, 172) reaches a fourth predetermined threshold which is greater than said first, second, and third predetermined thresholds.

22. Strut according to claim 21, wherein said limiting-suppression device comprises a closing valve (181) having a movable seal (186) which is shifted from a position in which it unblocks at least one limiting hole (140) in at least one discharge valve (140, 145) to a position in which it seals said limiting holes (140), when the pressure differential reaches said fourth threshold.

23. Strut according to claim 22, wherein said closing valve (181) is carried on said partition (110) in such a way that its movable seal (186) seals at least one limiting hole (140) drilled in said partition (110).

24. Strut according to claim 23, wherein the movable seal of the closing valve (181) is mounted as a slide valve (186) which slides in fluid-tight fashion in a transverse hole (182) in said partition (110) and which intersects a limiting hole (140), said transverse hole (182) being permanently connected (184, 185), on either side of said slide valve (186), with one of the two damper chambers (170, 172) respectively, in such a way that the pressures in said damper chambers are continuously applied on the ends of the slide valve (186), said slide valve being elastically repositioned (188) so as to free the limiting hole (140) by means of at least one elastic device (188) also housed in said transverse hole (182), said slide valve (186) being pushed against the force exerted by the elastic device (188) into the position in which it seals the limiting hole (140) when the pressure differential between the two damper chambers (170, 172) reaches said fourth threshold and produces on the slide valve (186) a force greater than the prestressing of the elastic device (188).

25. Strut according to any of claims 21 to 24, wherein the hydraulic damper (101) comprises a device for the restoration of the initial throttling through the annular throttling passage (139), said device comprising said limiting-suppression device (181) connected to each discharge valve (140, 145).

26. Strut according to claim 1, wherein said at least one connecting conduit joining the two chambers (71, 73) in the external axial position is a pipe (74) positioned outside the damper body (12) to which damper body said pipe is connected by its two ends.

27. Strut according to claim 1, wherein said at least one connecting conduit joining the two chambers (171, 173) in the external axial position is formed by an substantially longitudinal passage (174) set in the thickness of the damper body (105).

28. Strut according to claim 1, wherein said transverse partition (10) is unitary with the damper body (12), and wherein the transverse walls are dishes (68, 69) substantially in the form of disks which are held in a fixed position and separated from one another on the internal armature by a brace (23) of that armature which presses each of the dishes (68,69) against one of the two substantially radial damper bases (19, 20), respectively, each of which is unitary with one of the two internal tubular sections (15, 16), respectively.

29. Strut according to claim 1, wherein the transverse walls are pistons (168, 169) mounted for fluidtight sliding movement against the one (104) of the two armatures (104, 128) with which they are not unitary.

30. Strut according to claim 29, wherein said transverse partition (110) is unitary with the damper body (105), and wherein the pistons (168, 169) are each unitary with a respective one of the internal tubular sections (115, 116).

31. Strut according to claim 30, wherein at least one (168) of the two pistons is unitary with an internal tubular section (115) and a base (119) which seals the internal axial end of this tubular section (115).

32. Strut according to claim 30 or 31 wherein at least one (169) of the two pistons is embodied by the movable assembly comprising an external radial collar unitary with an internal tubular section (116) and an external radial collar (121) unitary with a base (120) mounted on an internal axial end-piece of said internal tubular section (116).

33. Strut according to claim, wherein the compensation device for controlling the thermal expansion (52) of the high-viscosity fluid is an accumulator in which the auxiliary chamber (58) is filled with fluid and pressurized by the action of a pressurization device (53, 54, 56) for filling of the two damper chambers (34, 35) under static pressure.

34. Strut according to claim 33, wherein said permanent connection between said auxiliary chamber (58) and at least one damper chamber (34) is furnished by a duct (59) which is calibrated over at least one portion of its length and which constitutes a filter for the dynamic pressure pulsations in the damper chambers (34, 35).

35. Strut according to claim 34, wherein the calibrated duct (59) passes through said damper base (19) which partially delimits said auxiliary chamber (58), and opens directly into the damper chamber (34) to which said damper base (19) is adjacent.

36. Strut according to claim 34, wherein the calibrated portion of the duct contains at least one radial hole (190) drilled in said central portion (123) of the internal armature (128), said radial hole opening, on one side, into said annular throttling passage (139) and, on the other side, into a longitudinal conduit (189) extending into the internal armature (128) and on the other side of a damper base (120) which is unitary with an internal tubular section (116) and opens into said auxiliary chamber (158) housed in said internal tubular section (116).

37. Strut according to claim 34, wherein the calibrated portion of the duct comprises at least one radial hole (191) set into the annular, transverse partition (110) and opening, on the one hand, into the longitudinal conduit (174) drilled into the thickness of the damper body and connecting the two compensation chambers (171 and 173), and, on the other hand, into said annular throttling passage (139).

38. Strut according to claim 33, wherein, in said accumulator, the base of said auxiliary chamber (158') is an elastically-deformable wall (156') made of an elastomer which provides fluid-tightness and the resilient return of said base into a position in which it compresses the fluid contained in the auxiliary chamber (158').

39. Strut according to claim 33, wherein, in said accumulator (52), said auxiliary chamber (58) is partially delimited by a flexible, fluid-tight diaphragm (56) subjected to the action produced by an elastic device (53) in the pressurization device.

40. Strut according to claim 39, wherein the pressurization device is pneumatic, and its elastic device is a volume of pressurized gas housed in a pneumatic chamber (53) which is partially delimited by said diaphragm.

41. Strut according to claim 40, wherein said auxiliary chamber (58) is delimited on the inside of an internal tubular section (15), between a sealing base (19) and said fluid-tight diaphragm (56), said diaphragm being cup-shaped and fastened in fluid-tight fashion by its peripheral edge (57) in said internal tubular section (15), and wherein said pressurized pneumatic chamber (53) is delimited between said diaphragm (56) and a cover (54) which seals the external axial end of said internal tubular section (15).

42. Strut according to claim 41, wherein the compensation device for controlling thermal expansion (52) contains a fluid-level indicator for the auxiliary chamber (58), said indicator comprising an indicator stick (62) one end of which is unitary with the central portion of the diaphragm (56), and which is mounted so as to slide axially in a tube (63) which is at least partially transparent and which projects on the outside of said cover (54), a valve (60) for the inflation of the pneumatic chamber (53) being mounted on said cover.

43. Strut according to claim 39, wherein the pressurization device is mechanical and its elastic device is a spring (154) which pushes a piston (153) against said diaphragm (156).

44. Strut according to claim 43, wherein said auxiliary chamber (158) is delimited on the inside of an internal tubular section (116) between a damper base (120) unitary with the internal axial end of said internal tubular section (116) and said diaphragm (156) of the unwinding type and of which the central portion is pressed against the piston (153) mounted so as to slide axially without fluid-tightness in said internal tubular section (116), said internal tubular section also housing the spring (154), the piston (153) being guided in its axial movements by a central shaft (163) unitary with the piston (153) and mounted axially so as to slide with slight radial play on the inside of a tubular brace (123), which brace maintains a uniform axial gap between said damper base (120) and another damper base (119) unitary with the internal axial end of the other internal tubular section (115).

45. Strut according to claim 44, wherein said compensation device for thermal expansion comprises a filling-level indicator for said auxiliary chamber (158) which comprises an indicator stick (162) unitary with said piston (153) and extending longitudinally outward through a base (125) which seals the external axial end of said internal tubular section (116), and against which the thrust spring (154) pushing the piston (153) abuts.

46. Strut according to claim 1, wherein the external tubular armature (4) comprises the rigid and dismountable assembly comprising two cylinders (5, 6) having the same transverse section, arranged so as to extend each other axially and substantially end-to-end by facing end flanges (7, 8) and between which is enclosed at least one radial peripheral part (11) of the transverse partition (10), such that the adjacent end-pieces of the two cylinders (5, 6) form the tubular damper body (12) and that the other end-piece of each of the cylinders forms the external tubular section (13, 14) of a resilient return device (2, 3), and wherein one (5) of the two cylinders further comprises at its end opposite to the end which makes it adjacent to the other cylinder (6), another flange (31) connecting the rigid, dismountable assembly to the rigid element (29), which is unitary with the external armature (4) and is preferably embodied as a bell-shaped connection-piece (29) equipped with a connecting eye (33) set on a ball-joint (32) constituting said corresponding means of jointing.

47. Strut according to claim 1, wherein the external tubular armature (104) comprises a central cylindrical body (105) unitary with said transverse partition (110), and forming a tubular damper body, and having two axial end-pieces (106, 107) in each of which is engaged and held a cylinder constituting the external tubular section (113, 114) of one of the resilient return devices (102, 103), such that one of said axial end-pieces (106) is simultaneously rigidly attached to the rigid element (129) unitary with the external armature (104) and embodied in the form of a bell-shaped connection-piece equipped with a connection eye (133) on a ball-joint (132) constituting said corresponding means of jointing.

48. Strut according to claim 1, wherein the internal armature (28) comprises, in addition to the two internal cylindrical tubular sections (15, 16), at least one radial base (19) having a centrally-placed hole and unitary with an internal tubular section (15), as well as at least one axial support (21) and an axial brace (23), in an arrangement whereby said brace holds at least one radial base (19) against a radial stop (24) carried by an axial support (21) which extends in a fluid-tight manner through the centrally-placed hole in said base (19).

49. Strut according to claim 48, wherein said radial stop is a movable stop which comprises a nut (24) screwed onto a threaded part of the corresponding axial support (21).

50. Strut according to claim 49, wherein at least one axial support is an axial end-portion (123a) of said brace (123), said axial end-portion being partially threaded and connected to the remaining part of the brace (123) by a shoulder against which a radial base (119) is secured by a nut (124) screwed into said axial end-portion (123a) of the brace.

51. Strut according to claim 48 or 49, wherein at least one axial support is an axial rod (21) also fitted into said tubular brace (23).

52. Strut according to claim 51, wherein said axial rod (21) is unitary with the rigid element (25) which forms one piece with the internal armature and is embodied in the form of a connection piece having, preferably, a connection eye (27) on a ball-joint (26), thereby forming said corresponding jointing means.

* * * * *

UNITED STATES PATENT AND TRADEMARK OFFICE
CERTIFICATE OF CORRECTION

PATENT NO. : 5,004,215

DATED : April 2, 1991

INVENTOR(S) : Aubry et al

It is certified that error appears in the above-identified patent and that said Letters Patent is hereby corrected as shown below:

Col. 39, line 8, claim 33, after "claim" insert --1--.

Signed and Sealed this

Twenty-sixth Day of January, 1993

Attest:

STEPHEN G. KUNIN

Attesting Officer

Acting Commissioner of Patents and Trademarks